United States Patent
Taguchi et al.

(10) Patent No.: US 6,995,226 B2
(45) Date of Patent: Feb. 7, 2006

(54) OPEN-RING COPOLYMER, HYDROGENATED OPEN-RING COPOLYMER, PROCESS FOR PRODUCTION OF BOTH, AND COMPOSITIONS

(75) Inventors: Kazunori Taguchi, Kawasaki (JP); Yasuo Tsunogae, Kawasaki (JP); Hitomi Takeuchi, Kawasaki (JP); Yasuhiro Wakisaka, Kawasaki (JP); Kei Sakamoto, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/480,002

(22) PCT Filed: Jun. 5, 2002

(86) PCT No.: PCT/JP02/05531

§ 371 (c)(1),
(2), (4) Date: Mar. 9, 2004

(87) PCT Pub. No.: WO02/100917

PCT Pub. Date: Dec. 19, 2002

(65) Prior Publication Data

US 2004/0152843 A1    Aug. 5, 2004

(30) Foreign Application Priority Data

Jun. 8, 2001    (JP) .............................. 2001-174872

(51) Int. Cl.
*C08G 61/08*    (2006.01)
(52) U.S. Cl. ...................... 526/281; 526/171; 526/279; 526/283; 525/326.5; 525/328.8; 525/329.5; 525/338; 524/553

(58) Field of Classification Search ................ 526/279, 526/281, 171, 283; 525/328.8, 338, 326.5, 525/329.5; 524/553
See application file for complete search history.

(56) References Cited

U.S. PATENT DOCUMENTS

| | | | |
|---|---|---|---|
| 6,197,894 B1 | 3/2001 | Sunaga et al. | |
| 6,486,264 B1 * | 11/2002 | Tsunogae et al. | ........... 525/339 |
| 6,713,154 B1 * | 3/2004 | Tsunogae et al. | ........... 428/131 |

FOREIGN PATENT DOCUMENTS

| | | |
|---|---|---|
| EP | 0 827 975 A2 | 11/1998 |
| JP | 11-52574 A | 2/1999 |
| JP | 2001-30272 A | 2/2001 |

* cited by examiner

*Primary Examiner*—Fred Teskin
(74) *Attorney, Agent, or Firm*—Birch, Stewart, Kolasch & Birch, LLP

(57) ABSTRACT

A ring-opened metathesis copolymer and its hydrogenated product having a desired monomer unit ratio and a high molecular weight and having hydroxyl groups or hydroxycarbonyl groups can be obtained by conducting a ring-opening metathesis copolymerization of a norbornene-type monomer having hydroxyl groups or hydroxycarbonyl groups with an unsubstituted norbornene-type monomer having at least three rings in the presence of a catalyst predominantly comprised of an organic ruthenium compound having coordinated therewith a neutral electron-donating ligand, and, if desired, hydrogenating the resulting copolymer. The thus-obtained ring-opened metathesis copolymer and its hydrogenation product are characterized by having a low water absorption, good adhesion to metal and other materials, good compatibility with a curing agent and other compounds, and high heat resistance, and exhibiting reduced signal retardation and signal noise.

17 Claims, No Drawings

OPEN-RING COPOLYMER, HYDROGENATED OPEN-RING COPOLYMER, PROCESS FOR PRODUCTION OF BOTH, AND COMPOSITIONS

TECHNICAL FIELD

This invention relates to a novel norbornene-type ring-opened metathesis copolymer (hereinafter abbreviated to as "ring-opened metathesis copolymer" or merely "copolymer", when appropriate), and a hydrogenated product of the copolymer. More particularly, it relates to a ring-opened copolymer and its hydrogenated product, which have well-balanced low water absorption, good electrical properties, as well as good adhesion to metal and good compatibility with other materials, and further have excellent heat resistance.

BACKGROUND ART

A ring-opened polymer derived from a norbornene-type monomer having no polar group, and its hydrogenated product, have good heat resistance, electrical properties and low water absorption, and therefore are widely used for electrical insulation. However, the polymer and hydrogenated product have poor adhesion to metal such as copper and silicon and glass and other materials, and poor compatibility with other compounds such as a curing agent and an epoxy resin.

A ring-opened polymer derived from a norbornene-type monomer having a polar group has also been proposed. More specifically, a polymer having a plurality of polar groups such as a hydroxyl group is disclosed in Japanese Unexamined Patent Publication No. H5-155988, which is obtained by a process wherein a norbornene-type monomer having an ester group or a hydroxyl group such as an acetate of 5,6-dihydroxymethylbicyclo[2.2.1]hept-2-ene is subjected alone to ring-opening polymerization in the presence of a tungsten-containing catalyst, and then, the resulting polymer is hydrogenated. A polymer having hydroxycarbonyl groups is disclosed in Japanese Unexamined Patent Publication No. H11-52574, which is obtained by a process wherein 8-methoxycarbonyltetracyclo[4.4.0.1$^{2,5}$.1$^{7,10}$] dodec-3-ene is subjected alone or together with bicyclo [2.2.1]hept-2-ene to ring-opening polymerization in the presence of a tungsten-containing catalyst, and then, the resulting homopolymer or copolymer is hydrogenated and further hydrolyzed. These polymers exhibit improved adhesion to some extent as compared with a polymer having no polar group, but, having high water absorption, and exhibit a long transmission retardation time for a high frequency signal in a GHz region, and tend to produce a noise. Further, a high-molecular-weight copolymer prepared by copolymerization of the above-mentioned norbornene-type monomer having a polar group with a bicyclio norbornene-type monomer has a low glass transition temperature Tg and poor heat resistance.

DISCLOSURE OF THE INVENTION

An object of the present invention is to provide a ring-opened metathesis copolymer and its hydrogenated product, which have good electrical properties, low water absorption, good adhesion to metal and other materials and good compatibility to a curing agent and other compounds, and good heat resistance.

The present inventors made researches for copolymerization of 8-methoxycarbonyltetracyclo[4.4.0.1$^{2,5}$.1$^{7,10}$]dodec-3-ene, as taught in Japanese Unexamined Patent Publication No. H11-52574, with a norbornene-type monomer having three or more rings and capable of giving a copolymer having a high Tg, using a tungsten-containing catalyst. However, side reactions occurred and consequently an intended ring-opened copolymer having desired high molecular weight and desired ratio of repeating units could not be obtained.

The present inventors made further researches to achieve the above-mentioned objects, and found that a norbornene-type ring-opened metathesis copolymer having a desired high molecular weight and containing as copolymerized monomer units a desired proportion of repeating units with a hydroxyl group or a hydroxycarbonyl group, and repeating units comprised only of non-polar groups, and a hydrogenated product of the copolymer can be obtained by using a specific ruthenium-containing catalyst, and further found that the copolymer and the hydrogenated product thereof have good adhesion to other materials such as metal and glass, and good compatibility with a curing agent and other compounds, and exhibit well-balanced good heat resistance, good electrical properties and low water absorption. Based on these findings, the present invention has been completed.

In accordance with the present invention, there are provided:

a ring-opened metathesis copolymer comprised of repeating units represented by the following general formula (1) and repeating units represented by the following general formula (2) or formula (3), wherein the ratio of the number of hydroxyl groups to the number of the total repeating units is in the range of 5% to 100%, and said copolymer has a weight average molecular weight in the range of 1,000 to 500,000 as measured by gel permeation chromatography and expressed in terms of the molecular weight of polystyrene;

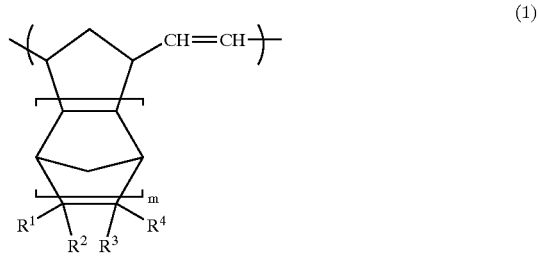

wherein at least one of R$^1$ to R$^4$ is a substituent having a hydroxyl group (—OH), other than a hydroxycarbonyl group, and the remainder of R$^1$ to R$^4$ is a hydrogen atom, a hydrocarbon group having 1 to 20 carbon atoms, or a group containing a halogen atom, a silicon atom, an oxygen atom or a nitrogen atom, other than a hydroxyl group and a hydroxycarbonyl group, and m is an integer of 0 to 2;

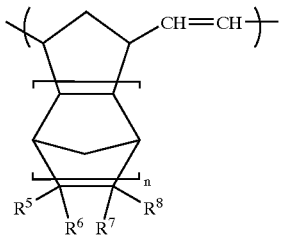

(2)

wherein $R^5$, $R^6$, $R^7$ and no each independently represent a hydrogen atom or a hydrocarbon group having 1 to 20 carbon atoms, and one of $R^5$ and $R^6$ may form a ring together with one of $R^7$ and $R^8$, and n is an integer of 1 or 2; and

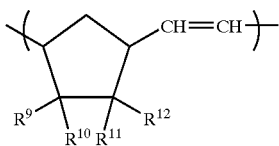

(3)

Wherein $R^9$, $R^{10}$, $R^{11}$ and $R^{12}$ each independently represent a hydrogen atom or a hydrocarbon group having 1 to 20 carbon atoms, provided that one of $R^9$ and $R^{10}$ forms a ring together with one of $R^{11}$ and $R^{12}$; and a ring-opened metathesis copolymer comprised of repeating units represented by the following general formula (4) and repeating units represented by the general formula (2) or formula (3), wherein the ratio of the number of hydroxycarbonyl groups to the number of the total repeating units is in the range of 5% to 50%, and said copolymer has a weight average molecular weight in the range of 1,000 to 500,000 as measured by gel permeation chromatography and expressed in terms of the molecular weight of polystyrene;

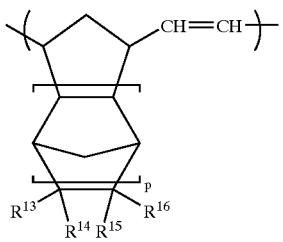

(4)

wherein at least one of $R^{13}$ to $R^{16}$ is a substituent having a hydroxycarbonyl group (—COOH), and the remainder of $R^{13}$ to $R^{16}$ is a hydrogen atom, a hydrocarbon group having 1 to 20 carbon atoms, or a group containing a halogen atom, a silicon atom, an oxygen atom or a nitrogen atom, other than a hydroxycarbonyl group, and p is an integer of 0 to 2.

In accordance with the present invention, there are further provided:

a hydrogenated product of a ring-opened metathesis copolymer, which product is comprised of repeating units of the general formula (1) and repeating units of the general formula (2) or formula (3), and, repeating units represented by the following general formula (5) and repeating units represented by the following general formula (6) or formula (7), wherein the sum of the repeating units of formula (1), the repeating units of formula (2) and the repeating units of formula (3) is in the range of 50% to 0% based on the total repeating units;

the sum of the repeating units of formula (5), the repeating units of formula (6) and the repeating units of formula (7) is in the range of 50% to 100% based on the total repeating units;

the ratio of the number of hydroxyl groups to the number of the total repeating units is in the range of 5% to 100%; and said hydrogenated product has a weight average molecular weight in the range of 1,000 to 500,000 as measured by gel permeation chromatography and expressed in terms of the molecular weight of polystyrene;

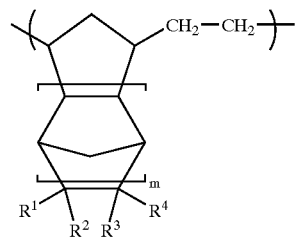

(5)

wherein $R^1$ to $R^4$ and m are the same as defined above;

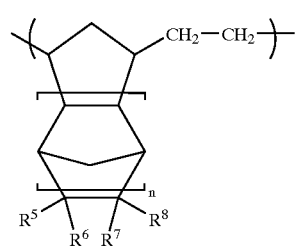

(6)

wherein $R^5$, $R^6$, $R^7$ and $R^8$ and n are the same as defined above;

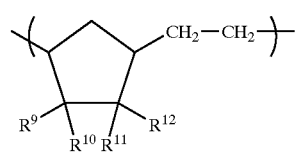

(7)

wherein $R^9$ $R^{10}$, $R^{11}$ and $R^{12}$ are the same as defined above; and a hydrogenated product of a ring-opened metathesis copolymer, which product is comprised of repeating units of the general formula (4), and repeating units of the general formula (2) or formula (3), and, repeating units represented by the following general formula (8) and repeating units represented by the general formula (6) or formula (7), wherein the sum of the repeating units of formula (4), the repeating units of formula (2) and the repeating units of formula (3) is in the range of 50% to 0% based on the total repeating units;

the sum of the repeating units of formula (8), the repeating units of formula (6) and the repeating units of formula (7) is in the range of 50% to 100% based on the total repeating units;

the ratio of the number of hydroxycarbonyl groups to the number of the total repeating units is in the range of 5% to 50%; and said hydrogenated product has a weight average molecular weight in the range of 1,000 to 500,000 as measured by gel permeation chromatography and expressed in terms of the molecular weight of polystyrene;

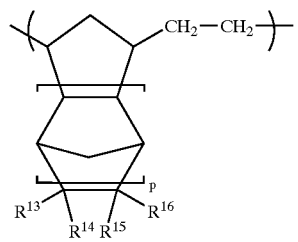

(8)

wherein $R^{13}$ to $R^{16}$ and p are the same as defined above; and further, in accordance with the present invention, there are further provided:

a process for producing a ring-opened metathesis copolymer comprising subjecting a monomer represented by the following general formula (9) and a monomer represented by the following general formula (10) or formula (11) to a ring-opening metathesis copolymerization in the presence of a catalyst predominantly comprised of an organic ruthenium compound with which a neutral electron-donating ligand has been coordinated,

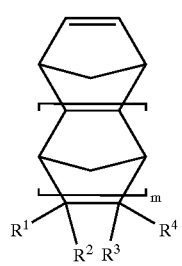

(9)

wherein $R^1$ to $R^4$ and m are the same as defined above;

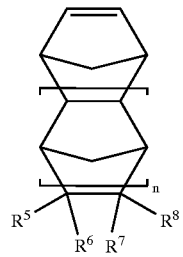

(10)

wherein $R^5$, $R^6$, $R^7$ and $R^8$ and n are the same as defined above;

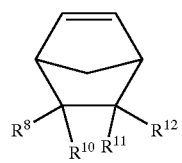

(11)

wherein $R^9$, $R^{10}$, $R^{11}$ and $R^{12}$ are the same as defined above;

a process for producing a ring-opened metathesis copolymer comprising subjecting a monomer represented by the following general formula (12) and a monomer represented by the general formula (10) or formula (11), to a ring-opening metathesis copolymerization in the presence of a catalyst predominantly comprised of an organic ruthenium compound with which a neutral electron-donating ligand has been coordinated;

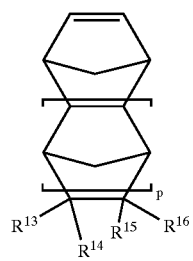

(12)

wherein $R^{13}$ to $R^{16}$ and p are the same as defined above; and a process for producing a hydrogenated product of a ring-opened metathesis copolymer, comprising hydrogenating double bonds in the backbone chain of the ring-opened metathesis copolymer produced by each of the above-mentioned production processes.

BEST MODE FOR CARRYING OUT THE INVENTION

The ring-opened metathesis copolymer of the present invention includes two types of copolymers, one of which is comprised of repeating units represented by the general formula (1) and repeating units represented by the general formula (2) or formula (3), and the other of which is comprised of repeating units represented by the general formula (4) and repeating units represented by the following general formula (2) or formula (3).

The hydrogenated product of a ring-opened metathesis copolymer of the present invention includes two types of hydrogenated products, one of which is comprised of repeating units of the general formula (1), repeating units of the general formula (2) or formula (3), and, repeating units represented by the general formula (5) and repeating units represented by the general formula (6) or formula (7): and the other of which is comprised of repeating units of the general formula (4), repeating units of the general formula (2) or formula (3), and, repeating units represented by the general formula (8) and repeating units represented by the general formula (6) or formula (7).

The ring-opened metathesis copolymer of the present invention and the hydrogenated product of the ring-opened metathesis copolymer of the present invention are preferably substantially free from repeating units other than the above-recited repeating units.

The repeating units represented by the general formulae (1), (4), (5) and (8) constituting the ring-opened metathesis copolymer and hydrogenated product thereof of the present invention have groups having a hydroxyl group or a hydroxycarbonyl group as substituents bound thereto. The repeating units represented by the general formulae (2), (3), (6) and (7) constituting the copolymer and its hydrogenated product are free from a substituent or have bound thereto hydrocarbon groups as substituents.

The ratio of the number of hydroxyl groups (other than hydroxyl groups in the hydroxycarbonyl groups) to the number of the total repeating units constituting the ring-opened metathesis copolymer or the hydrogenated product of the ring-opened metathesis copolymer is in the range of 5% to 100%, preferably 8% to 90%, and more preferably 10% to 80%. The ratio of the number of hydroxycarbonyl groups to the number of the total repeating units constituting the ring-opened metathesis copolymer or the hydrogenated product of the ring-opened metathesis copolymer is in the range of 5% to 50%, preferably 7% to 45%, and more preferably 8% to 40%. In the case when the ratio of the number of hydroxyl groups in the copolymer and the ratio of the number of hydroxycarbonyl groups in the copolymer are within the above-specified ranges, copolymers and hydrogenated products thereof, having good adhesion to other materials and good compatibility with other compounds as well as good and balanced heat resistance, electrical properties and low water absorption, are obtained.

The groups containing a hydroxyl group or a hydroxycarbonyl group in the repeating units of general formulae (1), (4), (5) and (8) may be either those which have been bound to a monomer used for copolymerization, or those which have been introduced, for example, by hydrolysis or other reactions after the copolymerization or the hydrogenation of copolymer.

In the hydrogenated product of ring-opened metathesis copolymer according to the present invention, the sum of the repeating units of formula (1), the repeating units of formula (2) and the repeating units of formula (3) is in the range of 50% to 0%, preferably 30% to 0%, more preferably 20% to 0%, and especially preferably 10% to 0%, and the sum of the repeating units of formula (5), the repeating units of formula (6) and the repeating units of formula (7) is in the range of 50% to 100%, preferably 70% to 100%, more preferably 80% to 100%, and especially preferably 90% to 100%.

The repeating units represented by the general formulae (1) to (4) are derived from norbornene-type monomers, and are obtained by subjecting norbornene-type monomers to a ring-opening metathesis copolymerization in the presence of the catalyst mentioned below.

The repeating units represented by the general formulae (5) to (8) are also derived from norbornene-type monomers, and are obtained by subjecting norbornene-type monomers to a ring-opening metathesis copolymerization in the presence of the catalyst mentioned below, and thereafter hydrogenating double bonds in the backbone chain of the produced copolymer.

The norbornene-type monomers used include bicycloheptene derivatives (m=0, n=0 and p=0 in the above formulae), tetracyclododecene derivatives (m=1, n=1 and p=1 in the above formulae) and hexacycloheptadecene derivatives (m=2, n=2 and p=2 in the above formulae). The norbornene-type monomers further include those derivatives which have substituents forming a ring. As specific examples of such substituents forming a ring, there can be mentioned a vinylene group, a methylene group, a dimethylene group, a trimethylene group, a teramethylene group, a pentamethylene group, a hexamethylene group and a heptamethylene group.

The repeating units represented by the general formulae (2), (3), (6) and (7) are derived from norbornene-type monomers having at least three rings which either have a hydrocarbon group as a substituent bound thereto, or are free from a substituent.

As specific examples of the norbornene-type monomers having at least three rings which either have a hydrocarbon substituent, or are free from a substituent, there can be mentioned unsubstituted monomers and hydrocarbon substituent-having monomers, represented by the general formula (10), which include tetracyclododecene derivatives such as tetraoyclo[$4.4.0.1^{2,5}.1^{7,10}$]dodec-3-ene, 8-methyltetracyclo[$4.4.0.1^{2,5}.1^{7,10}$]dodec-3-ene, 8-ethyltetracyclo[$4.4.0.1^{2,5}.1^{7,10}$]dodec-3-ene, 8-cyclohexyltetracyclo[$4.4.0.1^{2,5}.1^{7,10}$]dodec-3-ene, 8-cyclopentyltetracyclo[$4.4.0.1^{2,5}.1_{7,10}$]dodec-3-ene, 8-methylidenetetracyclo[$4.4.0.1^{2,5}.1^{7,10}$]dodec-3-ene, 8-ethylidenetetracyclo[$4.4.0.1^{2,5}.1^{7,10}$]dodec-3-ene, 8-vinyltetracyclo[$4.4.0.1^{2,5}.1^{7,10}$]dodec-3-ene, 8-propenyltetracyclo[$4.4.0.1^{2,5}.1^{7,10}$]dodec-3-ene, 8-cyclohexenyltetracyclo[$4.4.0.1^{2,5}.1^{7,10}$]dodec-3-ene, 8-cyclopentenyltetracyclo[$4.4.0.1^{2,5}.1^{7,10}$]dodec-3-ene and 8-phenyltetracyclo[$4.4.0.1^{2,5}.1^{7,10}$]dodec-3-ene and further include hexacycloheptadecene derivatives such as hexacyclo-[$6.6.1.1^{3,6}.1^{10,13}.0^{2,7}.0^{9,14}$]heptadec-4-ene, 11-methyl-hexayolo[$6.6.1.1^{3,6}.1^{10,13}.0^{2,7}.0^{9,14}$]heptadec-4-ene and 11-phenylhexacyclo[$6.6.1.1^{3,6}.1^{10,3}.0^{2,7}.0^{9,14}$]heptadec-4-ene; and unsubstituted monomers and hydrocarbon substituent-having monomers, represented by the general formula (11), which include tricyclo[$4.3.1^{2,5}.0$]-3-decene, tricyolo[$4.3.1^{2,5}.0$]-dec-3,7-diene (another name, dicyclopentadiene), tetracyclo-[$6.5.1^{2,5}.0^{1,6}.0^{8,13}$]tetradec-3,8,10,12-tetraene(another name, 1,4-methano-1,4,4a,9a-tetrahydrofluorene), tetracyclo-[$6.6.1^{2,5}.0^{1,6}.0^{8,13}$]pentadec3,8,10,12-tetraene(another name, 1,4-methano-1,4,4a,5,10,10a-hexahydroanthracene).

The above-mentioned unsubstituted or hydrocarbon substituent-having norbornene-type monomers may be used either alone or as a combination of at least two thereof. To obtain a ring-opened copolymer having excellent heat resistance and solubility in a solvent, unsubstituted monomers and hydrocarbon substituent-having monomers, represented by the general formula (11), and tetacylododecene derivatives are preferable. More specifically, tricyclo[$4.3.1^{2,5}.0$]-3-decene, tricycle[$4.3.1^{2,5}.0$]dec-3,7-diene, tetracyclo-[$6.6.1^{2,5}.0^{1,6}.0^{8,13}$]pentadec-3,8,10,12-tetraene; tetracyclo-[$4.4.0.1^{2,5}.1^{7,10}$]dodec-3-cene and 8-ethylidenetetracyclo-[$4.4.0.1^{2,5}1^{7,10}$]dodec-3-cene are preferable.

As specific examples of the bicyclic norbornene-type monomers, there can be mentioned bicyclo[2.2.1]hept-2-ene, 5-methylbicyclo [2.2.1]hept-2-ene, 5-ethylbicyclo-[2.2.1]hept-2-ene, 5-propylbicyclo[2.2.1]hept-2-ene, 5-butylbioyclo[2.2.1]hept-2-ene, 5-pentylbicyclo-[2.2.1]hept-2-ene, 5-hexylbicyclo[2.2.1]hept-2-ene, 5-heptylbicyclo [2.2.1]hept-5-ene, 5-octylbicyclo-[2.2.1]hept-2-ene, 5-nonylbicyclo[2.2.1]hept-2-ene, 5-decylbicyclo[2.2.1]hept-2-ene, 5-vinylbicyclo-[2.2.1]hept-2-ene, 5-ethylidenebicyclo[2.2.1]hept-2-ene, 5-cyclohexylbicyclo [2.2.1]hept-2-ene, 5-cyclohexenylbicyclo[2.2.1]hept-2-ene and 5-phenylbicyclo-[2.2.1]hept-2-ene. These bicyclic norbornene-type monomers can be copolymerized provided that the heat resistance of the resulting copolymer is not lowered to an undesirable extent. If a high heat resistance is required, it is preferable that the bicyclic norbornene-type monomers are not used.

The repeating units represented by the general formulae (1), (4), (5) and (8) are derived from norbornene-type monomers having bound thereto a substituent containing a hydroxyl group or a hydroxycarbonyl group, and norbornene-type monomers having groups which can be chemically converted to a hydroxyl group or a hydroxycarbonyl group by, for example, hydrolysis. Preferably, the repeating units of these formulae are derived from norbornene-type monomers represented by the general formulae (9) and (12). The substituents containing a hydroxyl group or a hydroxycarbonyl group may contain a halogen atom, a silicon atom, an oxygen atom or a nitrogen atom in addition to the hydroxyl or hydroxycarbonyl group, provided that the hydroxyl or hydroxycarbonyl group is contained in the substituents.

As specific examples of the norbornene-type monomers having a hydroxyl group, there can be mentioned bicycloheptene derivatives such as 5-hydroxybicyclo[2.2.1]hept-2-ene, 5-hydroxymethylbicyclo[2.2.1]hept-2-ene, 5,6-dihydroxymethylbicyclo[2.2.1]hept-2-ene, 5-hydroxyethoxycarbonylbioyclo[2.2.1]hept-2-ene, 5-methyl-5-hydroxyethoxycarbonylbicyclo[2.2.1]hept-2-ene, 5-hydroxybutoxycarbonylbicyclo[2.2.1]hept-2-ene, 5-hydroxypropoxycarbonylbicyclo[2.2.1]hept-2-ene and 5-methyl-5-hydroxypropoxycarbonylbicyclo[2.2.1]hept-2-ene; tetracyclododecene derivatives such as 8-hydroxytetracyclo-[4.4.0.1$^{2,5}$.1$^{7,10}$]dodec-3-ene, 8-hydroxymethyltetracyclo-[4.4.0.1$^{2,5}$.1$^{7,10}$]dodec-3-ene, 8,9-dihydroxymethyltetracyclo-[4.4.0.1$^{2,5}$.1$^{7,10}$]dodec-3-ene, 8-hydroxyethoxycarbonyl-tetracyclo[4.4.0.1$^{2,5}$.1$^{7,10}$]dodec-3-ene, 8-methyl-8-hydroxy-ethoxycarbonyltetracyclo [4.4.0.1$^{2,5}$.1$^{7,10}$]dodec-3-ene, 8-hydroxybutoxycarbonyltetracyclo[4.4.0.1$^{2,5}$.1$^{7,10}$]dodec-3-ene, 8-hydroxypropoxycarbonyltetracyclo[4.4.0.1$^{2,5}$.1$^{7,10}$] dodec-3-ene, and 8-methyl-8-hydroxypropoxycarbonyltetracyclo-[4.4.0.1$^{2,5}$.1$^{7,10}$]dodec-3-ene; and hexacycloheptadecene derivatives such as 11-hydroxyhexacyclo-[6.6.1$^{3,6}$. 1$^{10,13}$.0$^{2,7}$.0$^{9,14}$]heptadec-4-ene, 11-hydroxymethyl-hexacyclo[6.6.1$^{3,6}$.1$^{10,13}$.0$^{2,7}$.0$^{9,14}$]heptadec-4-ene 11,12-dihydroxymethylhexacyclo[6.6.1$^{3,6}$.1$^{10,13}$.0$^{2,7}$.0$^{9,14}$]heptadec-4-ene, 11-hydroxyethoxycarbonylhexacyclo-[6.6.1$^{3,6}$.1$^{10,13}$. 0$^{2,7}$.0$^{9,14}$]heptadec-4-ene 11-methyl-11-hydroxyethoxycarbonylhexacyclo[6.6.1$^{3,6}$.1$^{10,13}$.0$^{2,7}$.0$_{9,14}$]heptadec-4-ene, 11-hydroxybutoxyoarbonylhexacyclo-[6.6.1$^{3,6}$.1$^{10,13}$.0$^{2,7}$. 0$^{9,14}$]-heptadec-4-ene, 11-hydroxypropoxycarbonylhexacyclo[6.6.1$^{3,6}$.1$^{10,13}$. 0$^{2,7}$.0$^{9,14}$]-hept adec-4-ene and 11-methyl-11-hydroxypropoxycarbonyl-hexacyclo[6.6.1$^{3,6}$.1$^{10,13}$. 0$^{2,7}$.0$^{9,14}$]-heptadec-4-ene.

As specific examples of the norbornene-type monomers having a hydroxycarbonyl group, there can be mentioned bicycloheptene such as 5-hydroxyoarbonylbicyclo-[2.2.1] hept-2-ene, 5-hydroxycarbonylmethylbicyclo[2.2.1]-hept-2-ene, 5,6-dihydroxycarbonylbicyclo[2.2.1]hept-2-ene, 5-methyl-5-hydroxycarbonylbicyclo[2.2.1]hept-2-ene, 5-methyl-5,6-dihydroxycarbonylbicyclo[2.2.1]hept-2-ene and 5-hydroxycarbonyl-5-hydroxycarbonylmethylbicyclo [2.2.1]-hept-2-ene; tetracylododecene derivatives such as 5-hydroxycarbonyltetracyclo[4.4.0.1$^{2,5}$.1$^{7,10}$]dodec-3-ene, 5-hydroxycarbonylmethyltetracyclo[4.4.0.1$^{2,5}$.1$^{7,10}$]dodec-3-ene, 5,6-dihydroxycarbonyltetracyclo[4.4.0.1$^{2,5}$.1$^{7,10}$] dodec-3-ene, 5-methyl-5-hydroxycarbonyltetracyclo [4.4.0.1$^{2,5}$.1$^{7,10}$]dodec-3-ene, 5-methyl-5,6-dihydroxycarbonyltetracyclo-[4.4.0.1$^{2,5}$.1$^{7,10}$]dodec-3-ene, 5-hydroxycarbonyl-5-hydroxycarbonylmethyltetracyclo [4.4.0.1$^{2,5}$.1$^{7,10}$]dodec-3-ene, 8-hydroxycarbonyltetracyclo [4.4.0.1$^{2,5}$.1$^{7,10}$]dodec-3-ene, 8-hydroxycarbonylmethyltetracyclo[4.4.0.1$^{2,5}$.1$^{7,10}$]dodec-3-ene, 8,9-dihydroxycarbonyltetracyclo[4.4.0.1$^{2,5}$.1$^{7,10}$]dodec-3-ene, 8-methyl-8-hydroxycarbonyltetracyclo[4.4.0.1$^{2,5}$.1$^{7,10}$]-dodec-3-ene, 8-methyl-8,9-dihydroxycarbonyltetracyclo-[4.4.0.1$^{2,5}$.1$^{7,10}$]dodec-3-ene and 8-hydroxycarbonyl-8-hydroxycarbonylmethyltetracyclo[4.4.0.1$^{2,5}$.1$^{7,10}$]dodec-3-ene; and hexacycloheptadecene derivatives such as 11-hydroxyoarbonylbicyclo[6.6.1$^{3,6}$.1$^{10,13}$.0$^{2,7}$.0$^{9,14}$]-heptadec-4-ene, 11-hydroxycarbonylmethylhexaoyclo-[6.6. 1$^{3,6}$.1$^{10,13}$.0$^{2,7}$.0$^{9,14}$]heptadec-4-ene, 11,12-dihydroxycarbonylhexacyclo[6.6.1$^{3,6}$.1$^{10,13}$.0$^{2,7}$.0$^{9,14}$]heptadec-4-ene, 11-methyl-11-hydroxycarbonylhexacyclo-[6.6.1$^{3,6}$.1$^{10,13}$. 0$^{2,7}$.0$^{9,14}$]heptadec-4-ene, 11-methyl-11,12-dihydroxycarbonylhexacyclo[6.6.1$^{3,6}$.1$^{10,13}$.0$^{2,7}$.0$^{9,14}$]-heptadec-4-ene and 11-hydroxycarbonyl-11-hydroxycarbonyl-methyl-hexacyclo[6.6.1$^{3,6}$.1$^{10,13}$.0$^{2,7}$.0$^{9,14}$]heptadec-4ene.

The group capable of being chemically converted to a hydroxyl group or a hydroxycarbonyl group may be those which are chemically converted to a hydroxyl group or a hydroxycarbonyl group by, for example, decomposition or reduction. Such groups include, for example, —OCOR, —COOR and dicarboxylic acid anhydrides, wherein R may be any of straight-chain, branched-chain and cyclic, saturated or unsaturated hydrocarbon groups, and may have as a substituent a group containing a halogen atom, a silicon atom, an oxygen atom or a nitrogen atom, other than a hydroxyl group and a hydroxycarbonyl group.

As specific examples of norbornene-type monomers having —OCOR bound thereto, there can be mentioned formates, acetates, propionates, butyrates, valerates and benzoates of the above-recited bicycloheptene derivatives, tetracyclododecene derivatives and hexacycloheptadecene derivatives.

As specific examples of norbornene-type monomers having —COOR bound thereto, there can be mentioned methyl esters, ethyl esters, isopropylesters, n-butyl esters, t-butyl esters, phenyl esters and benzyl esters of the above-recited bicycloheptene derivatives, tetracyclododecene derivatives and hexacyoloheptadeoene derivatives.

As specific examples of the norbornene-type monomers having a dicarboxylic acid anhydride group bound threto, there can be mentioned bicycloheptene derivatives such as bicyclo[2.2.1]hept-2-ene-5,6-dicarboxylic anhydride and 5-methylbicyclo[2.2.1]hept-2-ene-5,6-dicarboxylic anhydride; tetracyclododecene derivatives such as tetracyclo [4.4.0.1$^{2,5}$.1$^{7,10}$]dodec-3-ene-8,9-dicarboxylic anhydride and 8-methyltetracyclo[4.4.0.1$^{2,5}$.1$^{7,10}$]-dodec-3-ene-8,9-dicarboxylic anhydride; and hexacycloheptadecene derivatives such as hexacyclo[6.6.1$^{3,6}$.1$^{10,13}$.0$^{2,7}$.0$^{9,14}$]-heptadec-4-ene-11,12-dicarboxylic anhydride and 11-methylhexacyclo[6.6.1$^{3,6}$.1$^{10,13}$.0$^{2,7}$.0$^{9,14}$]heptadec4-ene-11,12-dicarboxylic anhydride.

The norbornene-type monomers having the above-recited substituents may be used either alone or as a combination of two or more thereof. To obtain a ring-opened copolymer having excellent heat resistance and solubility in a solvent, bicyclic, tricyclic and tetracyclic norbornene-type monomers are preferable. More specifically, bicycloheptane derivatives having m-0 or p=o in the general formula (9) or formula (12) and tetracyclododecene derivatives having m=1 or p=1 in the general formula (9) or formula (12) are preferable.

The ring-opened metathesis copolymer of the present invention and its hydrogenated product have a weight average molecular weight in the range of 1,000 to 500,000, preferably 2,000 to 400,000 and more preferably 4,000 to 200,000. If the molecular weight is too small, the mechanical strength is poor. In contrast, if the molecular weight is too large, the copolymer is liable to difficult to hydrogenate. The ratio (Mw/Mn) of the weight average molecular weight (Mw) to the number average molecular weight (Mn) is usually in the range of 1 to 4, preferably 1.5 to 3. The weight average molecular weight and the number average molecular weight are measured by gel permeation chromatography and expressed in terms of those of polystyrene.

The ring-opened metathesis copolymer of the present invention and its hydrogenated product are preferably a non-crystalline resin. The ring-opened metathesis copolymer of the present invention and its hydrogenated product preferably have a glass transition temperature of at least 100° C., more preferably at least 120° C. Further, the ring-opened metathesis copolymer of the present invention and its hydrogenated product preferably have a melt index in the range of about 1 to about 200, preferably about 5 to about 100, as measured at 280° C. according to ASTM D1238.

The ring-opened metathesis copolymer of the present invention and its hydrogenated product have, as measured at 1 MHz according to JIS C2330, a specific permittivity of not larger than 3.2, preferably not larger than 3.0, and a dissipation factor of not larger than 0.015, preferably not larger than 0.01. Due to the specific permittivity and dissipation factor, falling within the above ranges, the ring-opened metathesis copolymer of the present invention and its hydrogenated product do not exhibit a signal retardation and give a low signal noise, even for high frequency signal at 1 GHz.

The process for producing the ring-opened metathesis copolymer of the present invention comprises subjecting the above-mentioned norbornene-type monomers to a ring-opening metathesis copolymerization in the presence of a catalyst predominantly comprised of an organic ruthenium compound with which a neutral electron-donating ligand has been coordinated, and, if desired, modifying substituents of the obtained copolymer by, for example, hydrolysis.

The process for producing the hydrogenated product of a ring-opened metathesis copolymer according to the present invention comprises subjecting the above-mentioned norbornene-type monomers to a ring-opening metathesis copolymerization in the presence of a catalyst predominantly comprised of an organic ruthenium compound with which a neutral electron-donating ligand has been coordinated; then, hydrogenating double bonds in the backbone chain of the obtained copolymer; and then, if desired, modifying substituents of the obtained copolymer by, for example, hydrolysis.

The catalyst used in the present invention is predominantly comprised of an organic ruthenium compound with which a neutral electron-donating ligand has been coordinated.

The neutral electron-donating ligand constituting the organic ruthenium compound is a ligand having a neutral charge when it is separated from the central metal, i.e., ruthenium.

Organic ruthenium compounds preferably used in the present invention are those with which an anionic ligand is coordinated. The anionic ligand is a ligand having a negative charge when it is separated from ruthenium. A counter anion may be present in the organic ruthenium compounds. By the term "counter ion" as used herein we mean an anion capable of forming an ion pair together with a ruthenium cation. The counter ion is not particularly limited provided that it is capable of forming such ion pair.

The organic ruthenium compound used in the present invention preferably includes those which are represented by the following general formulae (13), (14) and (15):

$$[(L^1)_a(Y^1)_b Ru]_x \qquad (13)$$

wherein each $Y^1$ independently represents an arbitrary anionic ligand, and each $L^1$ independently represents a neutral electron-donating ligand. Two, three or four ligands selected from $Y^1$ and/or $L^1$ may form a multidentate ohelate ligand a and b independently represent an integer of 1 to 4, and x represents an integer of 1 to 6.

$$[(L^2)_c(Y^2)_d Ru=(C=)_e CQ_2]_y \qquad (14)$$

where each $L^2$ independently represents a neutral electron-donating ligand, each $Y^2$ independently represents an anionic ligand, each Q independently represents a hydrogen atom or a hydrocarbon group having 1 to 20 carbon atoms which may contain a halogen atom, a nitrogen atom, an oxygen atom, a silicon atom, a phosphorus atom or a sulfur atom, c, d and y independently represent an integer of 1 to 4, and e represents 0 or 1.

$$[(L^3)_f(Y^3)_g Ru]X_z \qquad (15)$$

wherein each $L^3$ independently represents a neutral electron-donating ligand, each $Y^3$ independently represents an anionic ligand, X represents a counter anion, f and g independently represent an integer of 1 to 4, and z represents 1 or 2.

As specific examples of the neutral electron-donating ligand, there can be mentioned oxygen, water, carbonyls amines, pyridines, ethers, nitriles, esters, phosphines, phosphinites, phosphates, stibines, sulfoxides, thioethers, amides, aromatics, diolefins (which may be cyclic), olefins (which may be cyclic), isocyanides, thiocyanates and heterocylic carbene compounds. Of these, bipyridine and other pyridines; triphenylphosphine, tricyclohexylphosphine and other phosphines; p-cymene and other aromatics; cyclopentadiene and other cyclic diolefines; and, 1,3-dimesitylimidazolin-2-ylidene, 1,3-dimesitylimidazolidin-2-ylidene and other carbine compounds are preferable because, when these ligands are coordinated, the activity for copolymerization tends to be enhanced.

As specific examples of the anionic ligand, there can be mentioned halogens such as F, Br, Cl and I, hydrido, diketonato groups such as acetylacetonato, a cyclopentadienyl group, an allyl group, an alkenyl group, an alkyl group, an aryl group, an alkoxyl group, an aryloxy group, an alkoxycarbonyl group, an arylcarboxyl group, a carboxyl group, an alkyl- or aryl-sulfonate group, an alkylthio group, an alkenylthio group, an arylthio group, an alkylsulfonyl group and an alkylsulfinyl group. Of these, halogens, a cyclopentadienyl group, an allyl group, an alkyl group and an aryl group are preferable because, when these ligands are coordinated, the activity for copolymerization are enhanced.

As specific examples of Q in the above-mentioned general formula (14), there can be mentioned hydrogen, an alkenyl group, an alkynyl group, an alkyl group, an alkylidene group, an aryl group, a carboxyl group, an alkoxyl group, an alkenyloxy group, an alkynyloxy group, an aryloxy group, an alkoxycarbonyl group, an alkylthio group, an alkenylthio group, an arylthio group, an alkylsulfonyl group and an alkylsulfinyl group. Of these, an alkyl group, an alkylidene group, an aryl group, an alkoxyl group, an aryloxy group, an alkylthio group and an arylthio group, each of which has 1 to 100 carbon atoms, are preferable because, when these groups are coordinated, the activity for copolymerization tends to be enhanced.

As specific examples of the counter anion, there can be mentioned $BF_4^-$, $B(C_6H_6)_4^-$, $B(C_6F_6)_4^-$, $PF_6^-$, $SbF_6^-$, $ClO_4^-$, $IO_4^-$, p-toluenesulfonic acid anion and trifluoromethanesulfonic acid anion. Of these, $BF_4^-$, $B(C_6H_6)_4^-$, $B(C_6F_6)_4^-$, $PF_6^-$ and $SbF_6^-$ are preferable because, when these counter anions are present, the catalyst activity tends to be enhanced.

As specific examples of the polymerization catalyst represented by the general formula (13), there can be mentioned bis(cyclopentadienyl)ruthenium, chloro(cyclopentadienyl)-bis(triphenylphosphine)ruthenium, dichloro-(1,5-cyclooctadiene)ruthenium, dichlorotris-(triphenylphosphine)ruthenium, cis-dichlorobis-(2,2'-bipyridyl)rythenium dihydrate, dichlorobis-[(p-oimene)chlororuthenium] and dichloro(2,7-dimethylocta-2,6-diene-1,8-diyl)ruthenium.

As specific examples of the polymerization catalyst represented by the general formula (14), there can be mentioned bis(tricyclohexylphosphine)benzylideneruthenium dichloride, bis(triphenylphosphine)-3,3-diphenylpropenylideneruthenium dichloride, bis(tricyclohexylphosphine)phenylvinylidene-ruthenium dichloride, bis(tricyclohexylphosphine) t-butyl-vinylideneruthenium dichloride, bis(1,3-diisopropyl-imidazolin-2-ylidene)benzylideneruthenium dichloride, bis-(1,3-dicyolohexylimidazolin-2-ylidene)benzylideneruthenium dichloride, (1,3-dimesitylimidazolin-2-ylidene)-(tricyclohexylphosphine)benzylideneruthenium dichloride and (1,3-dimesitylimidazolidin-2-ylidene)(tricyclohexyl-phosphine)benzylideneruthenium dichloride.

As specific examples of the polymerization catalyst represented by the general formula (15), there can be mentioned [(p-cimene)(CH$_3$CN)$_3$Ru](BF$_4$)$_2$, [(C$_6$H$_6$)(CH$_3$CN)$_2$(Cl)Ru](BF$_4$), [(C$_6$H$_6$)(CH$_3$CN)$_3$Ru](PF$_6$)$_2$, [(CH$_3$CN)$_2$(Cl)(2,7-dimethylocta-2,6-diene-1,8-diyl)Ru](BF$_4$) and [(CH$_3$CN)$_3$ (2,7-dimethylocta-2,6-diene-1,8-diyl)Ru](BF$_4$)$_2$.

As means for enhancing the copolymerization activity of the above-mentioned polymerization catalyst, a neutral electron-donating compound can be added in an amount of 1 to 100 times by weight of the ruthenium metal. Such neutral electron-donating compound includes, for example, pyridines, phosphines, and heterocyclic carbene compounds such as the above-mentioned 1,3-diisopropylimidazolin-2-ylidene and 1,3-dimesitylimidazolydin-2-ylidene.

In the case when the polymerization catalysts represented by the general formulae (13), (14) and (15) are used, diazo compounds such as N$_2$CHCOOEt, acetylene compounds such as phenylacetylene, or silyl compounds such as Et$_2$SiH and Ph$_2$MeSiH can also be added in an amount of 1 to 100 times by weight of the ruthenium metal to enhance the activity for copolymerization. Note, "Et", "Ph" and "Me" means an ethyl group, a phenyl group and a methyl group, respectively.

Among the above-recited polymerization catalysts, the polymerization catalyst represented by the general formula (14) is especially preferable because this catalyst exhibits a high activity for copolymerization.

The reaction for ring-opening metathesis copolymerization can be carried out either in a solvent or without use of a solvent. However, the copolymerization reaction is preferably carried out in a solvent because the copolymer as-obtained by copolymerization can be subjected to hydrogenation reaction without isolating the copolymer. Any limitation is not imposed to the solvent used for copolymerization, provided that it is capable of dissolving the copolymer and giving any baneful influence on the copolymerization. As specific examples of the polymerization solvent, there can be mentioned aliphatic hydrocarbons such as pentane, hexane and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene and cyclooctane, aromatic hydrocarbons such as benzene, toluene, xylene and mesitylene; nitrogen-containing hydrocarbons such as nitromethane, nitrobenzene, acetonitrile, propionitrile and benzonitrile; ethers such as diethyl ether, tetrahydrofuran and dioxane; and halogen-containing hydrocarbons such as chloroform, dichloromethane, 1,2-dichloroethane, chlorobenzene, dichlorobenzene and trichlorobenzene. Of these, a solvent having a specific permittivity in the range of 2 to 5, preferably 2.1 to 4.5, and a mixed solvent composed of two or more kinds of solvents, having a specific permittivity in the same range, are advantageous. The permittivity of solvents is described in "Organic Solvent" second edition, John A. Riddick and Emory E. Topps Jr., 1955.

In the case when the copolymerization is carried out in a solvent, the concentration of norbornene-type monomers is preferably in the range of 1% to 50% by weight, more preferably 2% to 45% by weight, and especially preferably 5% to 40% by weight. If the concentration of monomers is lower than 1% by weight, the productivity of copolymer tends to be low. In contrast, when the concentration of monomers is higher than 50% by weight, the solution of copolymer is liable to have too high viscosity and be difficult to hydrogenate in the subsequent step.

The amount of the polymerization catalyst is in the range of 1:100 to 1:2,000,000, preferably 1:500 to 1:1,000,000 and more preferably 1:1,000 to 1:500,000, as expressed by the ratio (ruthenium metal monomers) by mole of ruthenium metal in the polymerization catalyst to norbornene-type monomers. If the amount of polymerization catalyst exceeds 1:100, the catalyst is often difficult to remove. In contrast, if the amount of polymerization catalyst is smaller than 1:2, 000,000, usually a copolymerization activity of the desired extent cannot be obtained. The polymerization temperature is not particularly limited, but is usually in the range of −100° C. to 200° C., preferably −50° C. to 180° C., more preferably −30° C. to 160° C. and most preferably 0° C. to 140° C. The polymerization time is usually in the range of 1 minute to 100 hours, and can be appropriately chosen depending upon the progress of copolymerization.

To modify the molecular weight of the copolymer and its hydrogenated product, a molecular weight modifier can be used in the present invention. As specific examples of the molecular weight modifier used, there can be mentioned α-olefins such as 1-butene, 1-pentene, 1-hexene and 1-octene; styrenes such as styrene and vinyltoluene; ethers such as ethyl vinyl ether, i-butyl vinyl ether and allyl glycidyl ether; halogen-containing compounds such as allyl chloride; oxygen-containing vinyl compounds such as allyl acetate, allyl alcohol and glycidyl methacrylate; and nitrogen-containing vinyl compounds such as acrylamide. By appropriately choosing the amount of molecular weight modifier within the range of 0.1% to 100% by mole based on the norbornene monomers, a ring-opened metathesis copolymer and its hydrogenated product, which have a desired high molecular weight, can be obtained.

The hydrogenation reaction involves a reaction wherein hydrogen is usually introduced in a reaction system in the presence of a hydrogenation catalyst to effect saturation of unsaturated double bonds in the backbone chain of the ring-opened metathesis copolymer to convert the double bonds to saturated single bonds.

The catalyst used for hydrogenation may be chosen from conventional catalysts used for hydrogenation of olefin compounds.

As specific examples of the hydrogenation catalyst, there can be mentioned Ziegler catalysts comprised of a combination of a transition metal compound with an alkali metal compound such as a combination of cobalt acetate with triethylaluminum, a combination of nickel acetylacetonato with triisobutylaluminum, a combination of titanocene dichloride with n-butyllithium, a combination of ziroonocene dichloride with sec-butyllithium, and a combination of tetrabutoxy titanate with dimethylmagnesium; and homogeneous catalysts including organic ruthenium catalysts represented by the above-mentioned general formulae (13), (14) and (15), and noble metal complex catalysts such as chlorotris-(triphenylphosphine)rhodium, dichlorotris-(triphenylphosphine)ruthenium and carbonyl(dihydrido)-tris (triphenylphosphine)ruthenium; heterogeneous catalysts comprising a metal such as nickel, palladium, platinum, rhodium or ruthenium, which are supported on a carrier such as carbon, silica, diatomaceous earth, alumina or titanium oxide; for example, nickel/silica, nickel/diatomaceous earth, nickel/alumina, palladium/carbon, palladium/silica, palladium/diatomaceous earth and palladium/alumina.

Among the above-recited hydrogenation catalysts, noble metal complex catalysts containing a noble metal such as rhodium or ruthenium are preferable because side reactions causing modification of functional groups do not occur, and carbon-carbon unsaturated bonds of the copolymer can be selectively hydrogenated. The organic ruthenium compounds represented by the general formulae (13), (14) and (15) are more preferable. Ruthenium compounds having coordinated therewith heterocyclic carbene compounds or phosphines, which have highly electron-donating property, are especially preferable.

The organic ruthenium compounds represented by the general formulae (13), (14) and (15) exhibit activity for both of copolymerization and hydrogenation, and hence, after the copolymerization is completed, the organic ruthenium compounds can be used as a hydrogenation catalyst for the subsequent hydrogenation. The ruthenium compounds used can be used for hydrogenation either as they are, or, after a catalyst modifier such as an α-olefin or a vinyl compound, for example, ethyl vinyl ether, is added to enhance the activity thereof.

The hydrogenation reaction is usually carried out in an organic solvent. The organic solvent used can appropriately be chosen depending upon the particular solubility of the resulting hydrogenated product, and may be the same as that used for copolymerization. Thus, after the copolymerization is completed, a hydrogenation catalyst can be added in the polymerization mixture without substituting the solvent used for copolymerization with a solvent for hydrogenation, to effect the hydrogenation reaction.

Preferable conditions adopted for the hydrogenation reaction vary depending upon the particular hydrogenation catalyst. The hydrogenation temperature is usually in the range of −20° C. to 250° C., preferably −10° C. to 220° C. and more preferably 0° C. to 200° C. The hydrogenation pressure is usually in the range of 0.01 to 10 MPa, preferably 0.05 to 8 MPa and more preferably 0.1 to 5 MPa. If the hydrogenation temperature is lower than −20° C., the rate of hydrogenation reaction is low. In contrast, if the hydrogenation temperature is higher than 250° C., side reactions tend to occur. If the hydrogenation pressure is lower than 0.01 MPa, the rate of hydrogenation reaction becomes low. In contrast, if the hydrogenation pressure is higher than 10 MPa, a high pressure reaction vessel must be used. The hydrogenation time is appropriately chosen so that a desired hydrogenation percentage can be obtained. When the hydrogenation time is within the range of 0.1 to 50 hours, at least 50%, preferably at least 70%, more preferably at least 80% and most preferably at least 90% of the carbon-carbon double bonds in the backbone of copolymer can be hydrogenated.

In the process of the present invention for the production of the ring-opened metathesis copolymer and its hydrogenated product, if desired, an additional treatment can be carried out for modifying the functional groups of the copolymer and hydrogenated product by, for example, hydrolysis.

For example, functional groups such as —OCOR, —COOR and a carboxylic acid anhydride group can be converted to —OH or —COOH by hydrolysis or other reactions.

The modification reaction can be carried out in the same manner as generally adopted for decomposing an ester or a carboxylic acid anhydride to convert it to an alcohol or a carboxylic acid. The modification reaction includes, for example, hydrolysis, thermal decomposition, and reduction by hydrogenation.

More specifically, the hydrolysis of an ester or a carboxylic acid anhydride includes, for example, (a) a procedure for allowing to directly react with water, (b) a procedure for allowing to react with an aqueous alkaline solution such as an aqueous solution of sodium hydroxide or potassium hydroxide, or aqueous ammonia, (c) a procedure for allowing to react with an aqueous acid solution such as aqueous solutions of hydrochloric acid, sulfuric acid, phosphoric acid and an organic sulfonic acid, and (d) a procedure for subjecting to transesterification reaction with a lower alcohol having 1 to 6 carbon atoms or a lower carboxylic acid having 1 to 6 carbon atoms. As a transesterification catalyst, alkaline compounds such as sodium hydroxide, potassium hydroxide, ammonia and amine compounds can be used. The hydrolysis reaction can be carried out in the presence or absence of a solvent. The solvent may be similar to those used for copolymerization or hydrogenation. Water, an alcohol and an ester can also be used as the solvent.

The thermal decomposition is usually carried out by heating the ring-opened metathesis copolymer or its hydrogenated product, which have —OCOR, —COOR or a carboxylic acid anhydride group, at a temperature of 100° C. to 400° C. for at least 1 second. Especially when the "R" is a secondary or tertiary alkyl group such as an isopropyl group, a 2-ethylhexyl group, a 2-phenylethyl group or a t-butyl group, the thermal decomposition reaction can be desirably promoted. The heating temperature is preferably at least 150° C.

The reduction by hydrogenation is carried out by reducing —OCOR or —COOR with hydrogen, or hydrogenating a carboxylic acid anhydride group. A hydrogenation catalyst is used for the reduction by hydrogenation, which may be the same as the catalyst used for hydrogenation of double bonds in the backbone chain of the ring-opened metathesis copolymer. The procedure for reduction by hydrogenation may be similar to that used for hydrogenation of double bonds in the backbone chain of the ring-opened metathesis copolymer. Therefore, the reduction by hydrogenation of —OCOR, —COOR or a carboxylic acid anhydride group can be carried out by a procedure wherein the reduction by hydrogenation of —OCOR, —COOR or a carboxylic acid anhydride group is effected simultaneously with the hydrogenation of double bonds in the backbone chain of the ring-opened metathesis copolymer; a procedure wherein the reduction by hydrogenation of —OCOR, —COOR or a carboxylic acid anhydride group is effected after completion of the hydrogenation of double bonds in the backbone chain of the ring-opened metathesis copolymer; or a procedure wherein the reduction by hydrogenation of —OCOR, —COOR or a carboxylic acid anhydride group is effected prior to the hydrogenation of double bonds in the backbone chain of the ring-opened metathesis copolymer.

It is advantageous that at least 50%, preferably at least 70%, more preferably at least 80% and most preferably at least 90% of the —OCOR, —COOR or the carboxylic acid anhydride groups in the ring-opened metathesis copolymer or its hydrogenated product is converted to —OH or —COOH by the reduction by hydrogenation of the copolymer or hydrogenated product.

The ring-opened metathesis copolymer of the present invention and its hydrogenated product have good electrical insulating property and other electrical properties, and low water absorption. For example, the water absorption is below 2%, preferably below 1.5%, as measured according to JIS K7209. The adhesion is such that, when it is measured by an X-cut tape method according to JIS K5400 wherein a tape specimen is adhered onto copper, silicon or glass substrate, the tape is cut, and then, the length of tape specimen separated from X-cut crossing points is measured. The separated length is shorter than 1.5 mm, preferably shorter than 1 mm.

The ring-opened metathesis copolymer of the present invention and its hydrogenated product have good electrical properties and low water absorption, as mentioned above, and exhibit good adhesion to metal and other materials and good compatibility with a functional group-containing compound such as a curing agent.

The curable resin composition of the present invention comprises a copolymer selected from the above-mentioned ring-opened metathesis copolymer and the hydrogenated product of the ring-opened metathesis copolymer, and a curing agent.

The curing agent used includes, for example, an ionic curing agent, a radical curing agent, and a curing agent having both ionic and radical curing properties.

As specific examples of the ionic curing agent, there can be mentioned aliphatic polyamine compounds such as hexamethylenediamine, triethylenetetramine, diethylenetriamine and tetraethylenepentamine; alicyclic polyamine compounds such as diaminocyclohexane, 3(4),8(9)-bis(aminomethyl)tricyclo[5.2.1.0$^{2,6}$]decane, 1,3-(diaminomethyl)cyclohexane, menthenediamine, isophoronediamine, N-aminoethylpyperazine, bis(4-amino-3-methylcyclohexyl)methane and bis(4-aminocyclohexyl)-methane; aromatic polyamine compounds such as, 4,4'-diaminodiphenyl ether, 4,4'-diaminodiphenylmethane, α,α'-bis(4-aminophenyl)-1,3-diisopropylbenzene, α,α'-bis(4-aminophenyl)-1,4-diisopropylbenzene, 4,4'-diaminodiphenyl-sulfone, methaphenylenediamine and methaxylylenediamine; bisazide compounds such as 4,4'-bisazidobenzal(4-methyl)-cyclohexanone, 4,4'-diazidocalcone, 2,6-bis(4'-azidobenzal)cyclohexanone, 2,6-bis(4'-azidobenzal)-4-methylcyclohexanone, 4,4'-diazidodiphenylsulfone, 4,4'-diazidodiphenylmethane and 2,2'-diazidostilbene; acid anhydrides such as phthalic anhydride, pyromellitic anhydride, benzophenonetetracarboxylic anhydride, nadic anhydride, 1,2-cyclohexanedicarboxylic anhydride and maleic anhydride-modified polypropylene; and dicarboxylic acid compounds such as fumaric acid, phthalic acid, maleic acid, trimellitic acid and HIMIC acid (5-norbornene-2,3-dicarboxylic anhydride); diol compounds such as 1,3-butanediol, 1,4-butanediol, hydroquinonedihydroxyethyl ether and tricyclodecane-dimethanol; triols such as 1,1,1-trimethylolpropane; polyhydric phenols such as phenol-novolak and cresol-novolak; polyamide compounds such as nylon-6, nylon-66, nylon-610, nylon-11, nylon-612, nylon-12, nylon-46, methoxymethylated polyamide, polyhexamethylenediamine terephthalamide and polyhexamethylenediamine isophthalamide; diisocyanate compounds such as hexamethylene-diisocyanate, toluylene-diisocyanate and triglycidyl isocyanurate; glycidyl ether-type epoxy compounds such as a phenol-novolak-type epoxy compound, a cresol-novolak-type epoxy compound, a cresol-type epoxy compound, bisphenol-A-type epoxy compound, a bisphenol-F-type epoxy compound, a brominated bisphenol-A-type epoxy compound and a brominated bisphenol-F-type epoxy compound; and polyfunctional epoxy compounds such as an alicyclic epoxy compound, a glycidyl ester-type epoxy compound, a glycidyl amine-type epoxy compound and an isocyanurate-type epoxy compound. Of these, diol compounds polyhydric compounds and polyfunctional epoxy compounds are preferable. Polyfunctional epoxy compounds are especially preferable.

The radical curing agent includes, for example, organic peroxides, and, as specific examples thereof, there can be mentioned methyl ethyl ketone peroxide, cyclohexanone peroxide, 1,1-(t-butylperoxy)-3,3,5-trimethylcyclohexane, 2,2-bis-(t-butylperoxy)butane, t-butyl hydroperoxide, 2,5-dimethylhexane-2,5-dihydroperoxide, dicumyl peroxide, 2,5-dimethyl-2,5-di(t-butylperoxy)hexyne-3, α,α'-bis-(t-butylperoxy-m-isopropyl)benzene, octanoyl peroxide, isobutyryl peroxide and peroxy dicarbonate.

As specific examples of the curing agent having both ionic and radical curing properties, there can be mentioned cyanurates such as triallyl cyanurate; and isocyanurates such as 1-allyl isocyanurate, 1,3-diallyl isocyanurate, 1,3-diallyl-5-benzyl isocyanurate, triallyl isocyanurate, 1-allyl-3,5-dibenzyl isocyanurate, 1-allyl-3,5diglycidyl isocyanurate and 1,3-diallyl-5-glycidyl isocyanurate.

These curing agents may be used either alone or as a combination of at least two thereof. Of these, isocyanurate curing agents are preferable because they give a cured product having excellent fire retardancy. The amount of curing agents is appropriately chosen depending upon the particular use of the cured product, but is usually in the range of 0.1 to 200 parts by weight, preferably 1 to 150 parts by weight and more preferably 10 to 100 parts by weight, based on 100 parts by weight of the ring-opened metathesis copolymer or the hydrogenated product thereof.

The curable resin composition of the present invention is preferably a composition comprising the ring-opened metathesis copolymer or the hydrogenated product thereof, and a curing agent, wherein the copolymer or the hydrogenated product and the curing agent are uniformly dissolved in each other. This composition having the two ingredients uniformly dissolved in each other is not separated into two layers nor becomes opaque.

The curable resin composition of the present invention may further contain additives which include, for example, rubber, other resin, fire retardant, filler, heat stabilizer, antioxidant, weather stabilizer, ultraviolet absorber, leveling agent, antistatic agent, slip agent, anti-blocking agent, anti-fogging agent, lubricant, dye, pigment, natural oil, synthetic oil, wax and emulsifier. The amount of additives is appropriately chosen provided that the object of the present invention is achieved.

The curable resin composition of the present invention gives a cured product having excellent electrical properties. Therefore, the curable resin composition is used as insulation material for multilayer substrates, electronic parts, IC chips and insulating wirings; prepregs; solder masks: protective films and layer insulation films for printed boards, electronic parts, IC chips and display elements: materials for display devices such as an EL device and a liquid crystal device; and element-built-in multilayer circuit-boards.

Now the invention will be specifically described by the following examples and comparative examples, that by no means limit the scope of the invention. Parts are by weight unless otherwise specified.

(1) Molelecular weight was measured by gel permeation chromatography (GPC) using tetrahydrofuran as a solvent and expressed in terms of that of polystyrene.
(2) The ratio of monomer units in a copolymer and the number of hydroxyl groups and hydroxycarbonyl groups were measured by $^1$H-NMR spectrum.
(3) Degree of hydrogenation was measured by $^1$H-NMR spectrum.
(4) Degree of hydrolysis was measured by IR spectrum (KBr method).
(5) Glass transition temperature (Tg) was measured by a differential scanning calorimeter at a temperature elevation rate of 10° C./min.

EXAMPLE 1

A glass reaction vessel equipped with a stirrer was charged with 311 parts of tetrahydrofuran, 77.8 parts of tetracyclo[4.4.0.1$^{2,5}$.1$^{7,10}$]dodec-3-ene, 22.2 parts of 5-hydroxyethoxycarbonylbicyclo[2.2.1]hept-2-ene and 0.51 part of 1-hexene. Then a solution of 0.05 part of (1,3-dimesityl-imidazolidin-2-ylidene)(tricyclohexylphosphine)-benzylideneruthenium dichloride in 44.9 parts of tetrahydrofuran was added to conduct a copolymerization at 70° C. When 2 hours elapsed, the copolymerization liquid was poured in a large amount of isopropanol to precipitate a solid content. The solid content was filtered and washed, and then, dried at 40° C. under a reduced pressure for 18 hours to give a ring-opened metathesis copolymer. The yield of copolymer was 98 parts. The copolymer had a glass transition temperature (Tg) of 178° C., and a number average molecular weight (Mn) of 22,100 and a weight average molecular weight (Mw) of 44,400. The monomer unit ratio in the copolymer was tetracyclo[4.4.0.1$^{2,5}$.1$^{7,10}$]dodec-3-ene/-5-hydroxyethoxycarbonylbicyclo[2.2.1]hept-2-ene=80/20 by mole. The ratio of number of hydroxyl groups was 20% based on the total repeating units.

EXAMPLE 2

By the same procedures as mentioned in Example 1, a ring-opened metathesis copolymer was obtained wherein 37 parts of tetracyclo[4.4.0.1$^{2,5}$.1$^{7,10}$]dodec-3-ene and 63 parts of 5-hydroxyethoxycarbonylbicyclo[2.2.1]hept-2-ene were used instead of 77.8 parts of tetracyclo[4.4.0.1$^{2,5}$.1$^{7,10}$]-dodec-3-ene and 22.2 parts of 5-hydroxyethoxycarbonylbicyclo-[2.2.1]hept-2-ene with all other conditions remaining the same. The yield of copolymer was 63 parts. The copolymer had a Tg of 154° C., and a number average molecular weight (Mn) of 26,200 and a weight average molecular weight (Mw) of 58,600. The monomer unit ratio in the copolymer was tetracyclo[4.4.0.1$^{2,5}$1$^{7,10}$]dodec-3-ene/5-hydroxyethoxycarbonylbicyclo[2.2.1]hept-2-ene=42/58 by mole. The ratio of number of hydroxyl groups was 58% based on the total repeating units.

EXAMPLE 3

By the same procedures as mentioned in Example 1, a ring-opened metathesis copolymer was obtained wherein 80.3 parts of 8-ethylidenetetracyclo[4.4.0.1$^{2,5}$.1$^{7,10}$]dodec-3-ene and 19.7 parts of 5-hydroxyethoxycarbonylbicyclo[2.2.1]-hept-2-ene were used instead of 77.8 parts of tetracyclo[4.4.0.1$^{2,5}$.1$^{7,10}$]-dodec-3-ene and 22.2 parts of 5-hydroxyethoxycarbonylbicyclo-[2.2.1]hept-2-ene with all other conditions remaining the same. The yield of copolymer was 95.1 parts. The copolymer had a Tg of 175° C., and a number average molecular weight (Mn) of 21,600 and a weight average molecular weight (Mw) of 44,100. The monomer unit ratio in the copolymer was 8-ethylidenetetracyclo-[4.4.0.1$^{2,5}$.1$^{7,10}$]dodec-3-ene/5-hydroxyethoxycarbonylbicyclo-[2.2.1]hept-2-ene=82/18by mole. The ratio of number of hydroxyl groups was 18% based on the total repeating units.

EXAMPLE 4

By the same procedures as mentioned in Example 3, a ring-opened metathesis copolymer was obtained wherein toluene (specific permittivity: 2.379) was used as a polymerization solvent instead of tetrahydrofuran, the amount of 1-hexene was changed to 0.91 part, and the amount of (1,3-dimesitylimidazolidin-2-ylidene)(tricyclohexylphosphine)-benzylideneruthenium dichloride was changed to 0.02 part with all other conditions remaining the same. The yield of copolymer was 93.2 parts. The copolymer had a number average molecular weight (Mn) of 13,400 and a weight average molecular weight (Mw) of 24,200. The monomer unit ratio in the copolymer was 8-ethylidenetetracyclo[4.4.0.1$^{2,5}$.1$^{7,10}$]dodec-3-ene/-5-hydroxyethoxycarbonylbicyclo[2.2.1]hept-2-ene=80/20 by mole. The ratio of number of hydroxyl groups was 20% based on the total repeating units.

Thereafter, 100 parts of the ring-opened metathesis copolymer was dissolved in 400 parts of toluene, and then, the resulting solution was placed in an autoclave equipped with a stirrer. Then, a hydrogenation catalyst solution was prepared by dissolving 0.05 part of bis(tricyclohexylphosphine)-benzylideneruthenium(IV)dichloride and 0.39 part of ethyl vinyl ether in 20 parts of toluene. The hydrogenation catalyst was added into the copolymer solution in the autoclave to conduct a hydrogenation reaction at 120° C. for 6 hours under a hydrogen pressure of 4.5 MPa. The liquid hydrogenation reaction mixture was poured in a large amount of isopropanol to completely precipitate the solid content. The solid content was filtered and washed, and dried at 90° C. under a reduced pressure for 18 hours to give a hydrogenated product of the ring-opened metathesis copolymer. The hydrogenated product had a Tg of 112° C., and a number average molecular weight (Mn) of 18,100 and a weight average molecular weight (Mw) of 32,800. $^1$H-NMR analysis of the hydrogenated product revealed that hydroxyl groups and ester groups were completely kept, and the amount of each of these groups was 20%, and further that at least 99% of the carbon-carbon double bonds in the backbone chain of copolymer was hydrogenated.

EXAMPLE 5

By the same procedures as mentioned in Example 2, a ring-opened metathesis copolymer was obtained wherein 8-hydroxymethyltetracyclo[4.4.0.1$^{2,5}$.1$^{7,10}$]dodec-3-ene was used instead of 5-hydroxyethoxycarbonylbicyclo[2.2.1]-hept-2-ene with all other conditions remaining the same. The yield of copolymer was 93 parts. The copolymer had a number average molecular weight (Mn) of 20,600 and a weight average molecular weight (Mw) of 36,600. The monomer unit ratio in the copolymer was tetracyclo[4.4.0.1$^{2,5}$.1$^{7,10}$]dodec-3-ene/-8-hydroxymethyltetracyclo[4.4.0.1$^{2,5}$.1$^{7,10}$]dodec-3-ene=35/65 by mole.

Thereafter, 1 part of the ring-opened metathesis copolymer was dissolved in 65.3 parts of tetrahydrofuran, and then, the resulting solution was placed in an autoclave equipped with a stirrer. Then, a hydrogenation catalyst solution was prepared by dissolving 0.09 part of bis(tricyclohexylphosphine)-benzylideneruthenium(IV)dichloride and 0.8 part of ethyl vinyl ether in 16.3 parts of toluene. The hydrogenation catalyst was added into the copolymer solution in the autoclave to conduct a hydrogenation reaction at 100° C. for 4 hours under a hydrogen pressure of 1 MPa. The liquid hydrogenation reaction mixture was poured in a large amount of isopropanol to completely precipitate the solid content. The solid content was filtered and washed, and dried at 70° C. under a reduced pressure for 18 hours to give a hydrogenated product of the ring-opened metathesis copolymer. The hydrogenated product had a Tg of 93° C., and a number average molecular weight (Mn) of 27,300 and a weight average molecular weight (Mw) of 48,800. $^1$H-NMR analysis of the hydrogenated product revealed that hydroxyl groups were completely kept, and the amount of hydroxyl groups was 65%, and further that at least 99% of the carbon-carbon double bonds in the backbone chain of copolymer was hydrogenated.

EXAMPLE 6

By the same procedures as mentioned in Example 1, a ring-opened metathesis copolymer was obtained wherein 50.8 parts of tetracyclo[4.4.0.1$^{2,5}$.1$^{7,10}$]dodec-3-ene and 49.2 parts of 5,6-dihydroxymethylbicyclo[2.2.1]hept-2-ene were used instead of 77.8 parts of tetracyclo[4.4.0. 1$^{2,5}$.1$^{7,10}$]dodec-3-ene and 22.2 parts of 5-hydroxyethoxycarbonylbicyclo[2.2.1]hept-2-ene with all other conditions remaining the same. The yield of copolymer was 68.3 parts. The copolymer had a Tg of 188° C., and a number average molecular weight (Mn) of 32,100 and a weight average molecular weight (MW) of 59,500. The monomer unit ratio in the copolymer was tetracyclo-[4.4.0.1$^{2,5}$.1$^{7,10}$]dodec-3-ene/-5,6-dihydroxymethylbicyclo[2.2.1]hept-2-ene=55/45 by mole. The ratio of number of hydroxyl groups was 90% based on the total repeating units.

EXAMPLE 7

A glass reaction vessel equipped with a stirrer was charged with 374 parts of cyclohexane, 69.1 parts of 8-ethylidenetetracyclo[4.4.0.1$^{2,5}$.1$^{7,10}$]dodec-3-ene, 30.9 parts of 5-t-butoxycarbonylbicyclo[2.2.1]hept-2-ene and 1.34 parts of 1-hexene. Then, a solution of 0.04 part of (1,3-dimesitylimidazolidin-2-ylidene)(tricyclohexylphosphine)-benzylideneruthenium dichloride in 24.2 parts of cyclohexane was added to conduct a copolymerization at 80° C. When 2 hours elapsed, the copolymerization liquid was poured in a large amount of isopropanol to precipitate a solid content. The solid content was filtered and washed, and then, dried at 40° C. under a reduced pressure for 18 hours to give a ring-opened metathesis copolymer. The yield of copolymer was 94.5 parts. The copolymer had a number average molecular weight (Mn) of 8,840 and a weight average molecular weight (Mw) of 14,900. The monomer unit ratio in the copolymer was 8-ethylidenetetracyclo[4.4.0.1$^{2,5}$.1$^{7,10}$]dodec-3-ene/-5-t-butoxycarbonylbicyclo[2.2.1]hept-2-ene=69/31 by mole.

Thereafter, 1 part of the ring-opened metathesis copolymer was dissolved in 39 parts of cyclohexane, and then, the resulting solution was placed in an autoclave equipped with a stirrer. Then, a hydrogenation catalyst solution was prepared by dissolving 0.05 part of bis(tricyclohexylphosphine)benzylideneruthenium(IV) dichloride and 0.88 part of ethyl vinyl ether in 3.9 parts of cyclohexane. The hydrogenation catalyst was added into the copolymer solution in the autoclave to conduct a hydrogenation reaction at 140° C. for 6 hours under a hydrogen pressure of 1 MPa. The liquid hydrogenation reaction mixture was poured in a large amount of isopropanol to completely precipitate the solid content. The solid content was filtered and washed and dried at 40° C. under a reduced pressure for 18 hours to give a hydrogenated product of the ring-opened metathesis copolymer. The hydrogenated product had a number average molecular weight (Mn) of 13,800 and a weight average molecular weight (Mw) of 22,400. $^1$H-NMR analysis of the hydrogenated product revealed that ester groups were completely kept, and further that at least 95% of the carbon-oarbon double bonds in the backbone chain of copolymer was hydrogenated.

Thereafter, 1 part of the hydrogenated product of the ring-opened metathesis copolymer was dissolved in 200 parts of toluene, and then, the resulting solution was placed in a glass reaction vessel equipped with a stirrer. Then 20 parts of trifluoroacetic acid was added into the copolymer solution in the glass reaction vessel, and the mixture was heated and refluxed for 12 hours. The liquid reaction mixture was poured in a large amount of isopropanol to completely precipitate the solid content. The solid content was filtered and washed, and dried at 80° C. under a reduced pressure for 18 hours to give a hydrolyzed product of the hydrogenated copolymer. The hydrolyzed product had a Tg of 158° C. IR spectrophotometric analysis of the hydrolyzed product revealed that absorption due to stretching vibration of OH of carboxylic acid appeared widely in the vicinity of 3000 cm$^{-1}$, and further that absorption due to stretching vibration of C—O of ester group completely disappeared in the vicinity of 1150 cm$^{-1}$. Thus, the degree of hydrolysis was proved to be 100%. The ratio of number of hydroxycarbonyl groups was 31% based on the total repeating units.

EXAMPLE 8

A glass reaction vessel equipped with a stirrer was charged with 386 parts of cyclohexane, 91.3 parts of dicyclopentadiene, 8.7 parts of 5,6-diacetyloxymethylbicyclo-[2.2.1]hept-2-ene and 0.61 part of 1-hexene. Then, a solution of 0.06 part of (1,3-dimesitylimidazolidin-2-ylidene)(tricyclohexylphosphine)benzylideneruthenium dichloride in 13.3 parts of cyclohexane was added to conduct a copolymerization at 80° C. When 2 hours elapsed, the copolymerization liquid was poured in a large amount of isopropanol to precipitate a solid content. The solid content was filtered and washed, and then, dried at 40° C. under a reduced pressure for 18 hours to give a ring-opened metathesis copolymer. The yield of copolymer was 87.6 parts. The copolymer had a number average molecular weight (Mn) of 15,900 and a weight average molecular weight (Mw) of 29,700. The ratio of number of ester groups was 12% based on the total repeating units.

Thereafter, 1 part of the ring-opened metathesis copolymer was dissolved in 39 parts of cyclohexane, and then, the resulting solution was placed in an autoclaveequipped with a stirrer. Then, a hydrogenation catalyst solution was prepared by dissolving 0.1 part of bis(trioyclohexylphosphine)benzylideneruthenium(IV)dichloride and 0.88 part of ethyl vinyl ether in 7.8 parts of cyclohexane. The hydrogenation catalyst was added into the copolymer solution in the autoclave to conduct a hydrogenation reaction at 100° C. for 8 hours under a hydrogen pressure of 10 MPa. The liquid hydrogenation reaction mixture was poured in a large amount of isopropanol to completely precipitate the solid content. The solid content was filtered and washed, and dried at 40° C. under a reduced pressure for 18 hours to give a hydrogenated product of the ring-opened metathesis copolymer. The hydrogenated product had a number average molecular weight (Mn) of 20,700 and a weight average molecular weight (Mw) of 38,600. $^1$H-NMR analysis of the hydrogenated product revealed that ester groups were completely kept, and further that at least 99% of the carbon-carbon double bonds in the backbone chain of copolymer was hydrogenated.

Thereafter, 1 part of the hydrogenated product of the ring-opened metathesis copolymer was dissolved in 200 parts of tetrahydrofuran, and then, the resulting solution was placed in a glass reaction vessel equipped with a stirrer. Then 20 parts of a 10% sodium methoxide solution in methanol was added into the copolymer solution in the glass reaction vessel, and the mixture was heated and refluxed for 12 hours. The liquid reaction mixture was poured in a large amount of isopropanol to completely precipitate the solid content. The solid content was filtered and washed, and dried at 80° C. under a reduced pressure for 18 hours to give a hydrolyzed product of the hydrogenated copolymer. The hydrolyzed product had a Tg of 108° C. IR spectrophotometric analysis of the hydrolyzed product revealed that absorption due to stretching vibration of alcohol OH appeared widely in the vicinity of 3300 cm$^{-1}$, and further that absorption due to stretching vibration of C=O of ester group completely disappeared in the vicinity of 1740 cm$^{-1}$. Thus, the degree of hydrolysis was proved to be 100%. The ratio of number of hydroxyl groups was 12% based on the total repeating units.

EXAMPLE 9

By the same procedures as mentioned in Example 1, a ring-opened metathesis copolymer was obtained wherein 80 parts of tetracyclo[4.4.0.1$^{2,5}$.1$^{7,10}$]dodec-3-ene and 20 parts of norbornenedicarboxylic anhydride (exo form: 95%) were used instead of 77.8 parts of tetracyclo[4.4.0.1$^{2,5}$.1$^{7,10}$]-dodec-3-ene and 22.2 parts of 5-hydroxyethoxycarbonylbicyclo-[2.2.1]hept-2-ene with all other conditions remaining the same. The yield of copolymer was 95 parts. The copolymer had a number average molecular weight (Mn) of 13,300 and a weight average molecular weight (Mw) of 23,400. The monomer unit ratio in the copolymer was tetracyclo [4.4.0.1$^{2,5}$.1$^{7,10}$]dodec-3-ene/norbornenedicarboxylic anhydride=80/20 by mole.

By the same procedures as described in Example 4, the thus-obtained ring-opened metathesis copolymer was hydrogenated with all conditions remaining the same. The hydrogenated product had a number average molecular weight (Mn) of 18,000 and a weight average molecular weight (Mw) of 31,500. $^1$H-NMR analysis of the hydrogenated product revealed that carboxylic acid anhydride groups were completely kept, and further that at least 99% of the carbon-carbon double bonds in the backbone chain of copolymer was hydrogenated.

Thereafter, 1 part of the hydrogenated product of the ring-opened metathesis copolymer was dissolved in 200 parts of tetrahydrofuran, and then, the resulting solution was placed in a glass reaction vessel equipped with a stirrer. Then 20 parts of a 10% sodium methoxide solution in methanol was added into the copolymer solution in the glass reaction vessel, and the mixture was heated and refluxed for 12 hours. Then, 13.5 parts of 10% aqueous hydrochloric acid was added to stop the reaction. The liquid reaction mixture was poured in a large amount of isopropanol to completely precipitate the solid content. The solid content was filtered and washed, and dried at 80° C. under a reduced pressure for 18 hours to give a reaction product of the hydrogenated copolymer. The reaction product had a Tg of 110° C. IR spectrophotometric analysis of the reaction product revealed that the degree of ring-opening of the cyclic acid anhydride was 100%. The ratio of number of hydroxycarbonyl groups was 20% based on the total repeating units.

COMPARATIVE EXAMPLE 1

By the same procedures as mentioned in Example 4, a ring-opened metathesis polymer was obtained wherein 100 parts of 8-methyl-8-methoxycarbonyltetracyclo[4.4.0.1$^{2,5}$.1$^{7,10}$]-dodec-3-ene was used as the sole monomer with all other conditions remaining the same. The yield of the ring-opened metathesis polymer was 95 parts. The polymer had a number average molecular weight (Mn) of 15,400 and a weight average molecular weight (MW) of 34,200.

By the same procedures as described in Example 4, the thus-obtained ring-opened metathesis polymer was hydrogenated with all conditions remaining the same. The hydrogenated product had a Tg of 170° C., and a number average molecular weight (Mn) of 18,600 and a weight average molecular weight (Mw) of 38,200. $^1$H-NMR analysis of the hydrogenated product revealed that ester groups were completely kept, and further that at least 99% of the carbon-carbon double bonds in the backbone chain of copolymer was hydrogenated. The ratio of number of ester groups was 100% and the ratio of number of hydroxycarbonyl groups was 0%, based on the total repeating units.

COMPARATIVE EXAMPLE 2

A reaction vessel was charged with 10 parts of the hydrogenated product of ring-opened metathesis polymer, obtained in Comparative Example 1, 10 parts of N-methylpyrrolidone, 50 parts of propylene glycol and 8 parts of potassium hydroxide. The content was stirred at 190° C. for 5 hours, and then, the thus-obtained reaction liquid was poured into a large amount of a mixed liquid composed of water, tetrahydrofuran and hydrochloric acid to coagulate the hydrolyzed product. The coagulated polymer was washed with water and dried. The thus-obtained hydrolyzed product had a Tg of 205° C. The degree of hydrolysis was 95%. The ratio of number of ester groups was 5% and the ratio of number of hydroxycarbonyl groups was 95%, based on the total repeating units.

COMPARATIVE EXAMPLE 3

By the same procedures as mentioned in Example 4, a ring-opened metathesis polymer was obtained wherein 100 parts of 8-ethyltetracyclo[$4.4.0.1^{2,5}.1^{7,10}$]dodec-3-ene was used as the sole monomer with all other conditions remaining the same. The yield of the ring-opened metathesis polymer was 99 parts. The polymer had a number average molecular weight (Mn) of 12,800 and a weight average molecular weight (Mw) of 34,100, as expressed in terms of those of polystyrene.

By the same procedures as described in Example 4, the thus-obtained ring-opened metathesis polymer was hydrogenated with all conditions remaining the same. The hydrogenated product had a Tg of 138° C., and a number average molecular weight (Mn) of 15,200 and a weight average molecular weight (Mw) of 34,100. It was proved that at least 99% of the double bonds was hydrogenated, and the ratio of number of functional groups was 0%, based on the total repeating units.

EXAMPLE 10

2 parts of each of the ring-opened metathesis copolymers and their hydrogenated products, which were obtained in Examples 1 to 9 and Comparative Examples 1 to 3, were dissolved in 6.5 parts of chlorobenzene.

The obtained solution was filtered under pressure, and the filtrate was spin-coated on each of a copper substrate and a silicon substrate. Each coated substrate was heated at 60° C. for 2 minutes, and further heated at 200° C. for 2 hours under a nitrogen gas stream to give a film having a thickness of 30±1 μm, composed of the copolymer or its hydrogenated product and adhered on the copper or silicon substrate.

By a similar procedure, a film having a thickness of about 5 μm was formed on a Teflon substrate wherein the spin-coating conditions were appropriately chosen.

Evaluation of Film

Adhesion of the film formed on a copper substrate or a silicon substrate was measured by an X-cut tape test according to JIS K5400. The following three ratings were assigned to the tested films.

A: separated film length is not larger than 1.0 mm

B: separated film length is larger than 1.0, but smaller than 2.0 mm

C: separated film length is at least 2 mm

The film formed on a Teflon substrate was carefully peeled from the substrate, and water absorption, permittivity and dissipation factor were measured.

The water absorption was measured according to JIS K7209, and the results were expressed by the following three ratings.

A: absorption is not larger than 1%

B: absorption is larger than 1%, but smaller than 2%

C: absorption is at least 2%

The permittivity and dissipation factor were measured at a high frequency of 1 MHz according to JIS C2330, and the results were expressed by the following three ratings.

Specific Permittivity:

A: specific permittivity is not larger than 3.0

B: specific permittivity is larger than 3.0, but smaller than 3.5

C: specific permittivity is at least 3.5

Dissipation Factor:

A: dissipation factor is not larger than 0.01

B: dissipation factor is larger than 0.01, but smaller than 0.02

C: permittivity is at least 0.02

To 2 parts of each solution of the copolymer or its hydrogenated product in chlorobenzene, 0.1 part of a hydrogenated bisphenol A type epoxy resin (tradename: EPICLON EXA-70151 available form Dainippon Ink and Chemicals Inc.) as a curing agent was added, and the mixture was thoroughly stirred and then left to stand. The miscibility of the copolymer of its hydrogenation product with a curing agent was evaluated by visually observing the state of the mixture. The results were expressed by the following two ratings.

A: the mixture was a uniform solution

B: the mixture was turbid or phase separation occurred

Signal retardation and signal noise were observed as follows. Each solution of the copolymer or its hydrogenated product having the curing agent added therein was cured, and an electro conductive layer wiring was formed on the cured product by plating. A high frequency signal was given at 1 GHz, and signal retardation and signal noise were observed. The results were expressed by the following two ratings.

Signal Retardation:

A: substantial signal retardation was not observed

B: substantial signal retardation was observed

Signal Noise:

A: substantial signal noise was not observed

B: substantial signal noise was observed

The results are shown in Table 1. Note, "-" means that measurement was not conducted.

TABLE 1

| | Example, Comp. Example | | | | | | | | | | | |
|---|---|---|---|---|---|---|---|---|---|---|---|---|
| | 1 | 2 | 3 | 4 | 5 | 6 | 7 | 8 | 9 | C1 | C2 | C3 |
| Water absorption | A | A | A | A | A | A | A | A | A | A | C | A |
| Specific permittivity | A | A | A | A | A | A | A | A | A | B | C | A |
| Dissipation factor | A | A | A | A | A | A | A | A | A | C | C | A |
| Adhesion to Cu substrate | A | A | A | A | A | A | A | A | A | B | A | C |
| Adhesion to Si substrate | A | A | A | A | A | A | A | A | A | B | A | C |
| Compatibility | A | A | A | A | A | A | A | A | A | C | A | C |
| Signal retardation | A | A | A | A | A | A | A | A | A | C | C | — |
| Signal noise | A | A | A | A | A | A | A | A | A | C | C | — |

COMPARATIVE EXAMPLE 4

By the same procedures as described in Example 7, copolymerization of 8-ethylidenetetracyclo[$4.4.0.1^{2,5}.1^{7,10}$]

dodec-3-ene with 5-t-butoxycarbonylbicyclo[2.2.1]hept-2-ene was carried out wherein the amount of 1-hexene was changed to 72 parts, and, as a catalyst solution, 0.74 part of a triethylaluminum solution (concentration: 0.5 mole/liter) in cyclohexane and 7.4 parts of a solution (concentration: 0.01 mole/liter) of $WCl_6$ having modified with t-butanol/methanol (the ratio of t-butanol/methanol/$WCl_6$=0.35/0.3/1 by mole) in cyclohexane were used instead of the solution of (1,3-dimesitylimidazolidin-2-ylidene)-(tricyclohexylphosphine)benzylideneruthenium dichloride in cyclohexane. All other conditions remained the same. In the midway of copolymerization, side reactions occurred and the viscosity of the polymerization mixture was drastically increased and solidified. The thus-obtained polymer was insoluble insolvent, and was different from the ring-opened metathesis copolymer of the present invention.

COMPARATIVE EXAMPLE 5

By the same procedures as described in Example 1, copolymerization of tetracyclo[4.4.0.1$^{2,5}$.1$^{7,10}$]dodec-3-ene with 5-hydroxyethoxycarbonylbicyclo[2.2.1]hept-2-ene was carried out wherein, as a catalyst solution, 0.74 part of a triethylaluminum solution (concentration: 0.5 mole/liter) in tetrahydrofuran and 7.4 parts of a solution (concentration: 0.01 mole/liter) of $WCl_6$ having modified with t-butanol/-methanol (the ratio of t-butanol/methanol/$WCl_6$=0.35/0.3/1 by mole) in tetrahydrofuran were used instead of the solution of (1,3-dimesitylimidazolidin-2-ylidene)-(tricyclohexy-lphosphine)benzylideneruthenium dichloride in tetrahydrofuran. All other conditions remained the same when 6 hours elapsed, the polymerization liquid was poured in a large amount of isopropanol, but, the solid content was not precipitated. Thus, the ring-opened metathesis copolymer of the present invention could not be obtained.

INDUSTRIAL APPLICABILITY

According to the production process of the present invention, a norbornene-type monomer having functional groups such as hydroxyl groups or hydroxycarbonyl groups can be copolymerized with a norbornene-type monomer having at least three rings by a ring opening metathesis copolymerization, to give a copolymer having a desired monomer unit ratio and a high molecular weight. The ring-opened metathesis copolymer of the present invention and its hydrogenated product have a low water absorption and exhibit reduced signal retardation and signal noise, and further have excellent adhesion to copper or silicon or other material and excellent compatibility with a curing agent. This is in contrast to the conventional ring-opened metathesis copolymer exhibiting poor compatibility with a curing agent. The curable composition of the present invention comprising the ring-opened metathesis copolymer or its hydrogenated product, and a curing agent, gives a cured product suitable as electrical insulating material for electronic parts and multilayer circuit boards.

What is claimed is:

1. A ring-opened metathesis copolymer comprised of repeating units represented by the following general formula (1) and repeating units represented by the following general formula (2) or formula (3), wherein the ratio of the number of hydroxyl groups to the number of the total repeating units is in the range of 5% to 100%, and said copolymer has a weight average molecular weight in the range of 1,000 to 500,000 as measured by gel permeation chromatography and expressed in terms of the molecular weight of polystyrene;

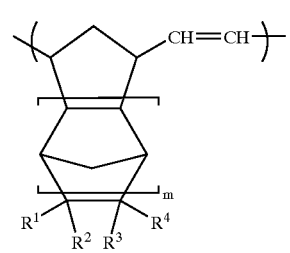

(1)

wherein at least one of $R^1$ to $R^4$ is a substituent having a hydroxyl group (—OH), other than a hydroxycarbonyl group, and the remainder of $R^1$ to $R^4$ is a hydrogen atom, a hydrocarbon group having 1 to 20 carbon atoms, or a group containing a halogen atom, a silicon atom, an oxygen atom or a nitrogen atom, other than a hydroxyl group and a hydroxycarbonyl group, and m is an integer of 0 to 2;

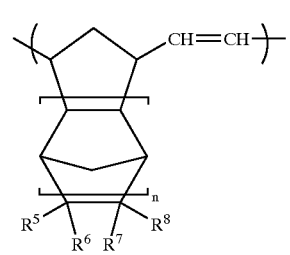

(2)

wherein $R^5$, $R^6$, $R^7$ and $R^8$ each independently represent a hydrogen atom or a hydrocarbon group having 1 to 20 carbon atoms, and one of $R^5$ and $R^6$ may form a ring together with one of $R^7$ and $R^8$, and n is an integer of 1 or 2; and

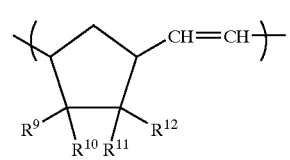

(3)

wherein $R^9$, $R^{10}$, $R^{11}$ and $R^{12}$ each independently represent a hydrogen atom or a hydrocarbon group having 1 to 20 carbon atoms, provided that one of $R^9$ and $R^{10}$ forms a ring together with one of $R^{11}$ and $R^{12}$.

2. The ring-opened metathesis copolymer according to claim 1, wherein, in the repeating units of formula (1), m is an integer of 0 or 1.

3. The ring-opened metathesis copolymer according to claim 1, wherein the repeating units of formula (1) are repeating units derived from at least one monomer selected from 5-hydroxybicyclo[2.2.1]hept-2-ene, 5-hydroxymethylbicyclo[2.2.1]hept-2-ene, 5,6-dihydroxymethylbicyclo[2.2.1]hept-2-ene and 5-hydroxyethoxycarbonylbicyclo[2.2.1]hept-2-ene.

4. A ring-opened metathesis copolymer comprised of repeating units represented by the following general formula (4) and repeating units represented by the following general formula (2) or formula (3), wherein the ratio of the number of hydroxycarbonyl groups to the number of the total repeating units is in the range of 5% to 50%, and said copolymer has a weight average molecular weight in the range of 1,000 to 500,000 as measured by gel permeation chromatography and expressed in terms of the molecular weight of polystyrene;

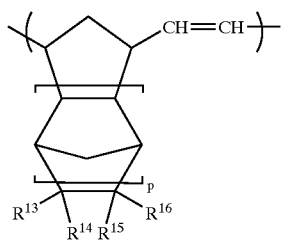

(4)

wherein at least one of $R^{13}$ to $R^{16}$ is a substituent having a hydroxycarbonyl group (—COCH), and the remainder of $R^{13}$ to $R^{16}$ is a hydrogen atom, a hydrocarbon group having 1 to 20 carbon atoms, or a group containing a halogen atom, a silicon atom, an oxygen atom or a nitrogen atom, other than a hydroxycarbonyl group, and p is an integer of 0 to 2;

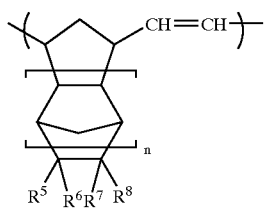

(2)

wherein $R^5$, $R^6$, $R^7$ and $R^8$ each independently represent a hydrogen atom or a hydrocarbon group having 1 to 20 carbon atoms, and one of $R^5$ and $R^6$ may form a ring together with one of $R^7$ and $R^8$, and n is an integer of 1 or 2; and

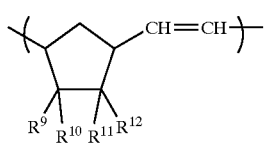

(3)

wherein $R^9$, $R^{10}$, $R^{11}$ and $R^{12}$ each independently represent a hydrogen atom or a hydrocarbon group having 1 to 20 carbon atoms, provided that one of $R^9$ and $R^{10}$ forms a ring together with one of $R^{11}$ and $R^{12}$.

5. A curable resin composition comprising the ring-opened metathesis copolymer as claimed in claim 1 or claim 4, and a curing agent.

6. A hydrogenated product of a ring-opened metathesis copolymer, which product is comprised of repeating units of the following general formula (1) and repeating units of the following general formula (2) or formula (3), and repeating units represented by the following general formula (5) and repeating units represented by the following general formula (6) or formula (7), wherein the sum of the repeating units of formula (1), the repeating units of formula (2) and the repeating units of formula (3) is in the range of 50% to 0% based on the total repeating units;

the sum of the repeating units of formula (5), the repeating units of formula (6) and the repeating units of formula (7) is in the range of 50% to 100% based on the total repeating units;

the ratio of the number of hydroxyl groups to the number of the total repeating units is in the range of 5% to 100%; and said hydrogenated product has a weight average molecular weight in the range of 1,000 to 500,000 as measured by gel permeation chromatography and expressed in terms of the molecular weight of polystyrene;

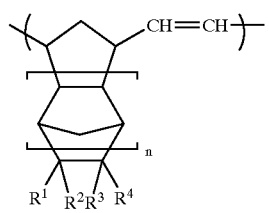

(1)

wherein at least one of $R^1$ to $R^4$ is a substituent having a hydroxyl group (—OH), other than a hydroxycarbonyl group, and the remainder of $R^1$ to $R^4$ is a hydrogen atom, a hydrocarbon group having 1 to 20 carbon atoms, or a group containing a halogen atom, a silicon atom, an oxygen atom or a nitrogen atom, other than a hydroxyl group and a hydroxycarbonyl group, and m is an integer of 0 to 2;

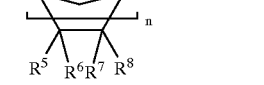

(2)

wherein $R^5$, $R^6$, $R^7$ and $R^8$ each independently represent a hydrogen atom or a hydrocarbon group having 1 to 20 carbon atoms, and one of $R^5$ and $R^6$ may form a ring together with one of $R^7$ and $R^8$, and n is an integer of 1 or 2;

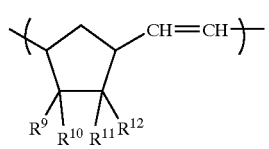

(3)

wherein $R^9$, $R^{10}$, $R^{11}$ and $R^{12}$ each independently represent a hydrogen atom or a hydrocarbon group having 1 to 20 carbon atoms, provided that one of $R^9$ and $R^{10}$ forms a ring together with one of $R^{11}$ and $R^{12}$;

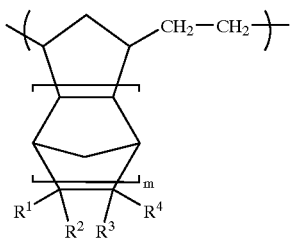

wherein $R^1$ to $R^4$ and m are the same as defined in the general formula (1);

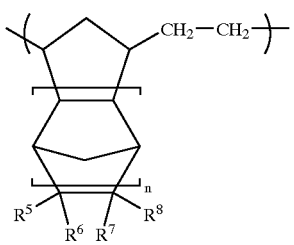

wherein $R^5$, $R^6$, $R^7$ and $R^8$ and n are the same as defined in the general formula (2); and

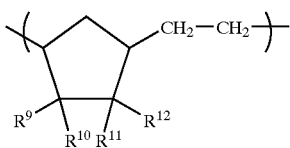

wherein $R^9$, $R^{10}$, $R^{11}$ and $R^{12}$ are the same as defined in the general formula (3).

7. The hydrogenated product according to claim 6, wherein, in the repeating units of formula (1) and the repeating units of formula (5), m is an integer of 0 or 1.

8. The hydrogenated product according to claim 6, wherein the repeating units of formula (1) and the repeating units of formula (5) are derived from at least one monomer selected from 5-hydroxybicyclo[2.2.1]hept-2-ene, 5-hydroxymethylbicyclo[2.2.1]hept-2-ene, 5,6-dihydroxymethylbicyclo[2.2.1]hept-2-ene, 5-hydroxyethoxycarbonylbicyclo[2.2.1]hept-2-ene and 5,6-dihydroxybicyclo[2.2.1]hept-2-ene.

9. A hydrogenated product of a ring-opened metathesis copolymer, which product is comprised of repeating units of the following general formula (4), and repeating units of the following general formula (2) or formula (3), and repeating units represented by the following general formula (8) and repeating units represented by the following general formula (6) or formula (7), wherein the sum of the repeating units of formula (4), the repeating units of formula (2) and the repeating units of formula (3) is in the range of 50% to 0% based on the total repeating units;

the sum of the repeating units of formula (8), the repeating units of formula (6) and the repeating units of formula (7) is in the range of 50% to 100% based on the total repeating units;

the ratio of the number of hydroxycarbonyl groups to the number of the total repeating units is in the range of 5% to 50%; and said hydrogenated product has a weight average molecular weight in the range of 1,000 to 500,000 as measured by gel permeation chromatography and expressed in terms of the molecular weight of polystyrene;

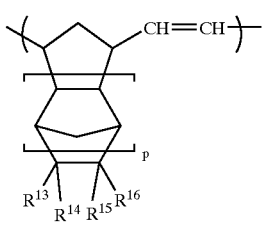

wherein at least one of $R^{13}$ to $R^{16}$ is a substituent having a hydroxycarbonyl group (—COOH), and the remainder of $R^{13}$ to $R^{16}$ is a hydrogen atom, a hydrocarbon group having 1 to 20 carbon atoms, or a group containing a halogen atom, a silicon atom, an oxygen atom or a nitrogen atom, other than a hydroxycarbonyl group, and p is an integer of 0 to 2;

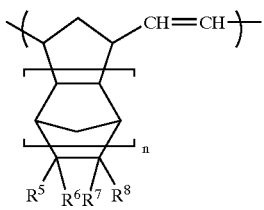

wherein $R^5$, $R^6$, $R^7$ and $R^8$ each independently represent a hydrogen atom or a hydrocarbon group having 1 to 20 carbon atoms, and one of $R^5$ and $R^6$ may form a ring together with one of $R^7$ and $R^8$, and n is an integer of 1 or 2;

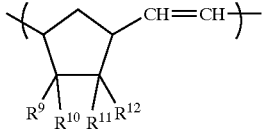

wherein $R^9$, $R^{10}$, $R^{11}$ and $R^{12}$ each independently represent a hydrogen atom or a hydrocarbon group having 1 to 20 carbon atoms, provided that one of $R^9$ and $R^{10}$ forms a ring together with one of $R^{11}$ and $R^{12}$;

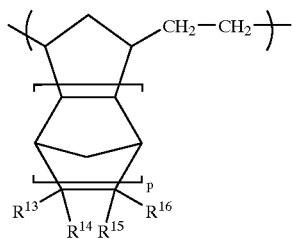
(8)

wherein $R^{13}$ to $R^{16}$ and p are the same as defined in general formula (4);

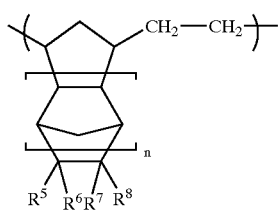
(6)

wherein $R^5$, $R^6$, $R^7$ and $R^8$ and n are the same as defined in the general formula (2); and

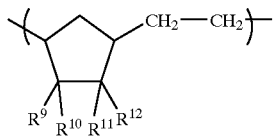
(7)

wherein $R^9$, $R^{10}$, $R^{11}$ and $R^{12}$ are the same as defined in the general formula (3).

10. The hydrogenated product according to claim 9, wherein, in the repeating units of formula (4) and the repeating units of formula (8), m is an integer of 0 or 1.

11. The hydrogenated product according to claim 9, wherein the repeating units of formula (4) and the repeating units of formula (8) are derived from at least one monomer selected from 5-hydroxycarbonylbicyclo[2.2.1]hept-2-ene, 5-hydroxycarbonylmethylbicyclo[2.2.1]hept-2-ene and 5,6-dihydroxyoarbonylmethylbicyclo[2.2.1]hept-2-ene.

12. A curable resin composition comprising the hydrogenated product of a ring-opened metathesis copolymer as claimed in claim 6 or claim 9, and a curing agent.

13. A process for producing a ring-opened metathesis copolymer comprising subjecting a monomer represented by the following general formula (9) and a monomer represented by the following general formula (10) or formula (11) to a ring-opening metathesis copolymerization in the presence of a catalyst predominantly comprised of an organic ruthenium compound with which a neutral electron-donating ligand has been coordinated;

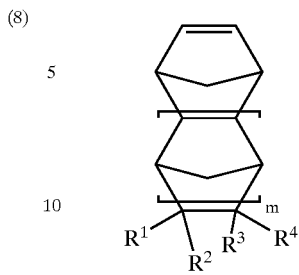
(9)

wherein at least one of $R^1$ to $R^4$ is a substituent having a hydroxyl group (—OH), other than a hydroxycarbonyl group, and the remainder of $R^1$ to $R^4$ is a hydrogen atom, a hydrocarbon group having 1 to 20 carbon atoms, or a group containing a halogen atom, a silicon atom, an oxygen atom or a nitrogen atom, other than a hydroxyl group and a hydroxycarbonyl group, and m is an integer off 0 to 2;

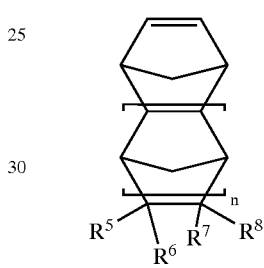
(10)

wherein $R^5$, $R^6$, $R^7$ and $R^8$ each independently represent a hydrogen atom or a hydrocarbon group having 1 to 20 carbon atoms, and one of $R^5$ and $R^6$ may form a ring together with one of $R^7$ and $R^8$, and n is an integer of 1 or 2; and

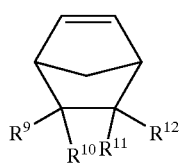
(11)

wherein $R^9$, $R^{10}$, $R^{11}$ and $R^{12}$ each independently represent a hydrogen atom or a hydrocarbon group having 1 to 20 carbon atoms, provided that one of $R^9$ and $R^{10}$ forms a ring together with one of $R^{11}$ and $R^{12}$.

14. The production process according to claim 13 wherein the organic ruthenium compound is represented by the following general formula (14):

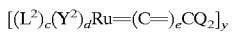
(14)

wherein each $L^2$ independently represents a neutral electron-donating ligand, each $Y^2$ independently represents an anionic ligand, each Q independently represents a hydrogen atom or a hydrocarbon group having 1 to 20 carbon atoms which may contain a halogen atom, a nitrogen atom, an oxygen atom, a silicon atom, a phosphorus atom or a sulfur atom, c, d and y independently represent an integer of 1 to 4, and e represents 0 or 1.

15. A process for producing a ring-opened metathesis copolymer comprising subjecting a monomer represented by the following general formula (12) and a monomer represented by the following general formula (10) or formula (11), to a ring-opening metathesis copolymerization in the presence of a catalyst predominantly comprised of an organic ruthenium compound with which a neutral electron-donating ligand has been coordinated;

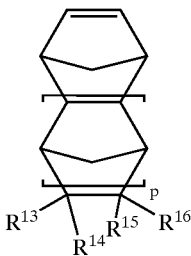

(12)

wherein at least one of $R^{13}$ to $R^{16}$ is a substituent having a hydroxycarbonyl group (—COOH), and the remainder of $R^{13}$ to $R^{16}$ is a hydrogen atom, a hydrocarbon group having 1 to 20 carbon atoms, or a group containing a halogen atom, a silicon atom, an oxygen atom or a nitrogen atom, other than a hydroxycarbonyl group, and p is an integer of 0 to 2;

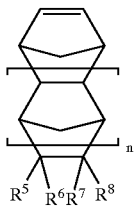

(10)

wherein $R^5$, $R^6$, $R^7$ and $R^8$ each independently represent a hydrogen atom or a hydrocarbon group having 1 to 20 carbon atoms, and one of $R^5$ and $R^6$ may form a ring together with one of $R^7$ and $R^8$, and n is an integer of 1 or 2; and

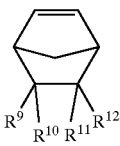

(11)

wherein $R^9$, $R^{10}$, $R^{11}$ and $R^{12}$ each independently represent a hydrogen atom or a hydrocarbon group having 1 to 20 carbon atoms, provided that one of $R^9$ and $R^{10}$ forms a ring together with one of $R^{11}$ and $R^{12}$.

16. The production process according to claim 15 wherein the organic ruthenium compound is represented by the following general formula (14):

$$[(L^2)_c(Y^2)_d Ru=(C=)_e CQ_2]_y$$

wherein each $L^2$ independently represents a neutral electron-donating ligand, each $Y^2$ independently represents an anionic ligand, each Q independently represents a hydrogen atom or a hydrocarbon group having 1 to 20 carbon atoms which may contain a halogen atom, a nitrogen atom, an oxygen atom, a silicon atom, a phosphorus atom or a sulfur atom, c, d and y independently represent an integer of 1 to 4, and e represents 0 or 1.

17. A process for producing a hydrogenated product of a ring-opened metathesis copolymer, comprising hydrogenating double bonds in the backbone chain of the ring-opened metathesis copolymer produced by the process as claimed in claim 13 or claim 15.

* * * * *